(12) United States Patent
Yi et al.

(10) Patent No.: US 10,897,741 B2
(45) Date of Patent: Jan. 19, 2021

(54) POWER SHARING BASED ON PROCESSING TIME RELATED TO CARRIERS

(71) Applicant: LG ELECTRONICS INC., Seoul (KR)

(72) Inventors: Yunjung Yi, Seoul (KR); Hyunho Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/609,201

(22) PCT Filed: Apr. 27, 2018

(86) PCT No.: PCT/KR2018/004940
§ 371 (c)(1),
(2) Date: Oct. 28, 2019

(87) PCT Pub. No.: WO2018/199691
PCT Pub. Date: Nov. 1, 2018

(65) Prior Publication Data
US 2020/0068504 A1 Feb. 27, 2020

Related U.S. Application Data

(60) Provisional application No. 62/491,308, filed on Apr. 28, 2017, provisional application No. 62/492,931, (Continued)

(51) Int. Cl.
*H04W 52/34* (2009.01)
*H04W 72/12* (2009.01)
*H04W 52/14* (2009.01)

(52) U.S. Cl.
CPC ......... *H04W 52/34* (2013.01); *H04W 52/146* (2013.01)

(58) Field of Classification Search
CPC ..... H04W 52/00; H04W 52/04; H04W 52/06; H04W 52/14; H04W 52/146;
(Continued)

(56) References Cited

U.S. PATENT DOCUMENTS

2015/0282104 A1* 10/2015 Damnjanovic ... H04W 72/0446
455/522
2017/0111891 A1* 4/2017 He ...................... H04W 52/367

FOREIGN PATENT DOCUMENTS

KR 20160110942 9/2016
KR 20160114685 10/2016
(Continued)

OTHER PUBLICATIONS

European Patent Office Application Serial No. 18791904.8, Search Report dated Mar. 16, 2020, 9 pages.
(Continued)

*Primary Examiner* — Philip Sobutka
(74) *Attorney, Agent, or Firm* — Lee Hong Degerman Kang Waimey

(57) ABSTRACT

A method and an apparatus for power control in a wireless communication system are provided. When long-term evolution (LTE) and a new radio access technology (NR) are combined by means of dual connectivity (DC), etc., dynamic resource sharing can be used. Specifically, a user equipment (UE) determines whether or not uplink (UL) transmission is performed at a specific time point in a first carrier having a first processing time. When it is determined that UL transmission is not performed at the specific time point in the first carrier, the UE determines power for UL transmission at the specific time point in a second carrier having a second processing time shorter than the first processing time, on the basis of guaranteed power for the first carrier.

13 Claims, 18 Drawing Sheets

Related U.S. Application Data filed on May 1, 2017, provisional application No. 62/557,137, filed on Sep. 11, 2017, provisional application No. 62/654,176, filed on Apr. 6, 2018.

(58) Field of Classification Search
CPC ..... H04W 52/18; H04W 52/26; H04W 52/30; H04W 52/34; H04W 52/38; H04W 72/12
USPC ........................................................ 455/522
See application file for complete search history.

(56) References Cited

FOREIGN PATENT DOCUMENTS

| | | |
|---|---|---|
| KR | 20160138544 | 12/2016 |
| KR | 20160144986 | 12/2016 |
| WO | 2014017792 | 1/2014 |
| WO | 2015034299 | 3/2015 |

OTHER PUBLICATIONS

NTT DOCOMO, "Power-control mechanisms for dual connectivity", 3GPP TSG RAN WG1 Meeting #77, R1-142264, May 2014, 8 pages.
Huawei, et al., "Low frequency assisted high frequency operation," 3GPP TSG RAN WG1 Meeting #86, R1-166114, Aug. 2016, 4 pages.
PCT International Application No. PCT/KR2018/004940, International Search Report dated Aug. 13, 2018, 4 pages.

* cited by examiner

POWER SHARING BASED ON PROCESSING TIME RELATED TO CARRIERS

CROSS-REFERENCE TO RELATED APPLICATIONS

This application is the National Stage filing under 35 U.S.C. 371 of International Application No. PCT/KR2018/004940, filed on Apr. 27, 2018, which claims the benefit of U.S. Provisional Application No. 62/491,308, filed on Apr. 28, 2017, 62/492,931, filed on May 1, 2017, 62/557,137, filed on Sep. 11, 2017, and 62/654,176, filed on Apr. 6, 2018, the contents of which are all hereby incorporated by reference herein in their entireties.

TECHNICAL FIELD

The present disclosure relates to wireless communication and, more particularly, to a method and apparatus for power sharing in new radio access technology (NR).

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more communication devices require great communication capacity, a demand with respect to enhanced mobile broadband (eMBB) communication is spotlighted. Further, there is a main issue that a plurality of devices and objects are connected so that large machine type communication (MTC) providing various services regardless of time and location to be considered as next generation communication. Further, ultra-reliable and low latency communication (URLLC) considering service/user equipment (UE) sensitive to reliability and delay has been discussed. As described above, introduction of a next generation radio access technology considering eMBB, a large MTC, URLLC has been discussed. For convenience of the description, such new radio access technology may refer to a new radio access technology (NR).

A wavelength is short in a millimeter wave (mmW) so that a plurality of antennas may be installed at the same area. For example, the wavelength is 1 cm at a 30 GHz band, total 100 antenna elements may be installed in a secondary arrangement form at 0.5λ (wavelength) on a panel of 5×5 cm2. Accordingly, a plurality of antenna elements is used at the mmW band so that a beamforming gain is increased to increase coverage or a throughput.

In this case, if a transceiver is included to adjust transmission power and a phase by antenna element, an independent beamforming is possible by frequency resource. However, if transceivers are installed at 100 antenna elements, respectively, the effectiveness is deteriorated in a cost side. Accordingly, it is considered that a plurality of antenna elements are mapped to one transceiver and a direction of a beam is adjusted to an analog phase shifter. Such an analog beamforming scheme can create only one beam direction so that a frequency selective beamforming cannot be performed.

A hybrid beamforming having B transceivers having the number less than Q antenna elements in an intermediate form of digital beamforming and analog beamforming may be considered. In this case, although the number of direction of the beam capable of being simultaneously transmitted is changed according to a connection scheme of B transceivers and Q antenna elements, the number of direction of the beam is limited to less than B.

According to unique characteristics of NR, a structure of a physical channel and/or related characteristics of NR may be different from those of an existing LTE. For an efficient operation of the NR, various schemes may be suggested.

SUMMARY

The present disclosure provides a method and apparatus for power sharing in new radio access technology (NR). The present disclosure discusses a mechanism for power sharing between carriers when a long-term evolution (LTE) carrier and an NR carrier and/or NR carriers are aggregated with carrier aggregation (CA) or dual connectivity (DC).

In an aspect, a method for a user equipment (UE) to control power in a wireless communication system is provided. The method includes determining whether or not uplink (UL) transmission is performed at a specific time point in a first carrier having a first processing time, and when it is determined that the UL transmission is not performed at the specific time point in the first carrier, determining power for the UL transmission at the specific time point in a second carrier having a second processing time shorter than the first processing time, based on a guaranteed power for the first carrier.

In another aspect, a user equipment (UE) in a wireless communication system is provided. The UE includes a memory, a transceiver, and a processor connected to the memory and the transceiver. The processor is configured to determine whether or not uplink (UL) transmission is performed at a specific time point in a first carrier having a first processing time, and when it is determined that the UL transmission is not performed at the specific time point in the first carrier, determine power for the UL transmission at the specific time point in a second carrier having a second processing time shorter than the first processing time, based on a guaranteed power for the first carrier.

When carriers with various characteristics are aggregated, power can be shared between the carriers, and therefore maximum UE power given to UE can be efficiently used.

DETAILED DESCRIPTION

Hereinafter, the following description will be made while focusing on an NR based wireless communication system. However, the present disclosure is limited thereto. The present disclosure is applicable to another wireless communication system, for example, 3rd generation partnership project (3GPP) long-term evolution (LTE)/LTE-A(advanced) or institute of electrical and electronics engineers (IEEE) having the same characteristic to be described below.

A 5G system is a 3GPP system including a 5G access network (AN), a 5G core network (CN) and user equipment (UE). The UE may be called other terms such as a mobile station (MS), a user terminal (UT), a subscriber station (SS), or a wireless device. A 5G AN is an access network including a non-3GPP access network and/or a new generation radio access network (NG-RAN) connected to the 5G CN. The NG-RAN is a wireless access network having a common characteristic connected to the 5G CN and for supporting at least one of following options.

1) Independent type new radio (NR).
2) The NR is an anchor having E-UTRA extension.
3) Independent type E-UTRA.
4) An E-UTRA is an anchor having NR extension.

Figure 1:
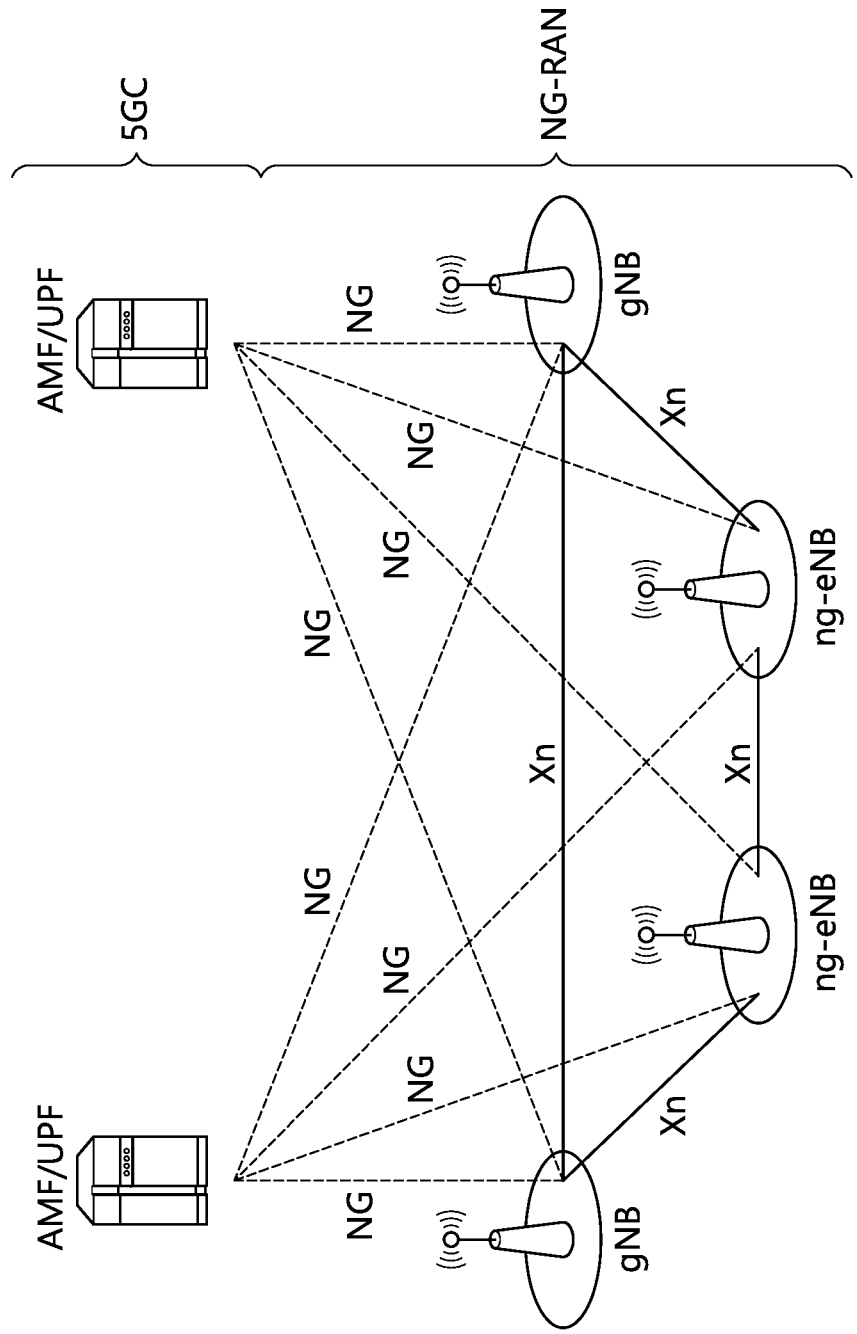
FIG. 1 shows a NG-RAN architecture.

FIG. 1 shows a NG-RAN architecture. Referring to FIG. 1, the NG-RAN includes at least one NG-RAN node. The NG-RAN node includes at least one gNB and/or at least one ng-eNB. A gNB/ng-eNB may be called a base station (BS) or an access point. A gNB provides an NR user plane and a control plane protocol termination toward the UE. An ng-eNB provides an E-UTRA user plane and a control plane protocol termination toward the UE. A gNB is connected with an ng-eNB through an Xn interface. The gNB and the ng-eNB are connected with the 5G CN through the NG interface. In detail, the gNB and the ng-eNB are connected with an access and mobility management function (AMF) through an NG-C interface, and are connected with a user plane function (UPF) through an NG-U interface.

The gNB and/or ng-eNB host the following functions:
Functions for radio resource management: Radio bearer control, radio admission control, connection mobility control, dynamic allocation of resources to UEs in both uplink and downlink (scheduling);
Internet protocol (IP) header compression, encryption and integrity protection of data;
Selection of an AMF at UE attachment when no routing to an AMF can be determined from the information provided by the UE;
Routing of user plane data towards UPF(s);
Routing of control plane information towards AMF;
Connection setup and release;
Scheduling and transmission of paging messages;
Scheduling and transmission of system broadcast information (originated from the AMF or operations & maintenance (O&M));
Measurement and measurement reporting configuration for mobility and scheduling;
Transport level packet marking in the uplink;
Session management;
Support of network slicing;
Quality of service (QoS) flow management and mapping to data radio bearers;
Support of UEs in RRC_INACTIVE state;
Distribution function for non-assess stratum (NAS) messages;
Radio access network sharing;
Dual connectivity;
Tight interworking between NR and E-UTRA.

The AMF hosts the following main functions:
NAS signaling termination;
NAS signaling security;
AS security control;
Inter CN node signaling for mobility between 3GPP access networks;
Idle mode UE reachability (including control and execution of paging retransmission);
Registration area management;
Support of intra-system and inter-system mobility;
Access authentication;
Access authorization including check of roaming rights;
Mobility management control (subscription and policies);
Support of network slicing;
Session management function (SMF) selection.

The UPF hosts the following main functions:
Anchor point for Intra-/Inter-radio access technology (RAT) mobility (when applicable);
External protocol data unit (PDU) session point of interconnect to data network;
Packet routing & forwarding;
Packet inspection and user plane part of policy rule enforcement;
Traffic usage reporting;
Uplink classifier to support routing traffic flows to a data network;
Branching point to support multi-homed PDU session;
QoS handling for user plane, e.g. packet filtering, gating, UL/DL rate enforcement;
Uplink traffic verification (service data flow (SDF) to QoS flow mapping);
Downlink packet buffering and downlink data notification triggering.

The SMF hosts the following main functions:
Session management;
UE IP address allocation and management;
Selection and control of UP function;
Configures traffic steering at UPF to route traffic to proper destination;
Control part of policy enforcement and QoS;
Downlink data notification.

In the NR, a plurality of orthogonal frequency division multiplexing (OFDM) numerologies may be supported. A plurality of numerologies may be mapped to different subcarrier spacings, respectively. For example, a plurality of numerologies mapped to various subcarrier spacings of 15 kHz, 30 kHz, 60 kHz, 120 kHz, and 240 kHz may be supported.

Downlink (DL) transmission and uplink (UL) transmission are configured in a frame having a length of 10 ms in the NR. One frame includes 10 subframes having a length of 1 ms. Each frame is divided into two half-frames having the same size. A half-frame 0 is configured by subframes 0-4. A half-frame 1 is configured by subframes 5-9. In a carrier, one frame group is included on UL and one frame group is included on DL.

A slot is configured by each numerology in the subframe. For example, in a numerology mapped to a subcarrier spacing of 15 kHz, one subframe includes one slot. In a numerology mapped to a subcarrier spacing of 30 kHz, one subframe includes two slots. In a numerology mapped to a subcarrier spacing of 60 kHz, one subframe includes four slots. In a numerology mapped to a subcarrier spacing of 120 kHz, one subframe includes eight slots. In a numerology mapped to a subcarrier spacing of 240 kHz, one subframe includes 16 slots. The number of OFDM symbols per slot may maintain 14. A start point of a slot in the subframe may be arranged in a start point of an OFDM symbol in time.

In the slot, the OFDM symbol may be classified into a DL symbol, a UL symbol, or a flexible symbol. In the DL slot, it may be assumed that DL transmission occurs in only a DL symbol or a flexible symbol. In the UL slot, the UE may perform UL transmission in only the UL symbol or the flexible symbol.

Figure 2:
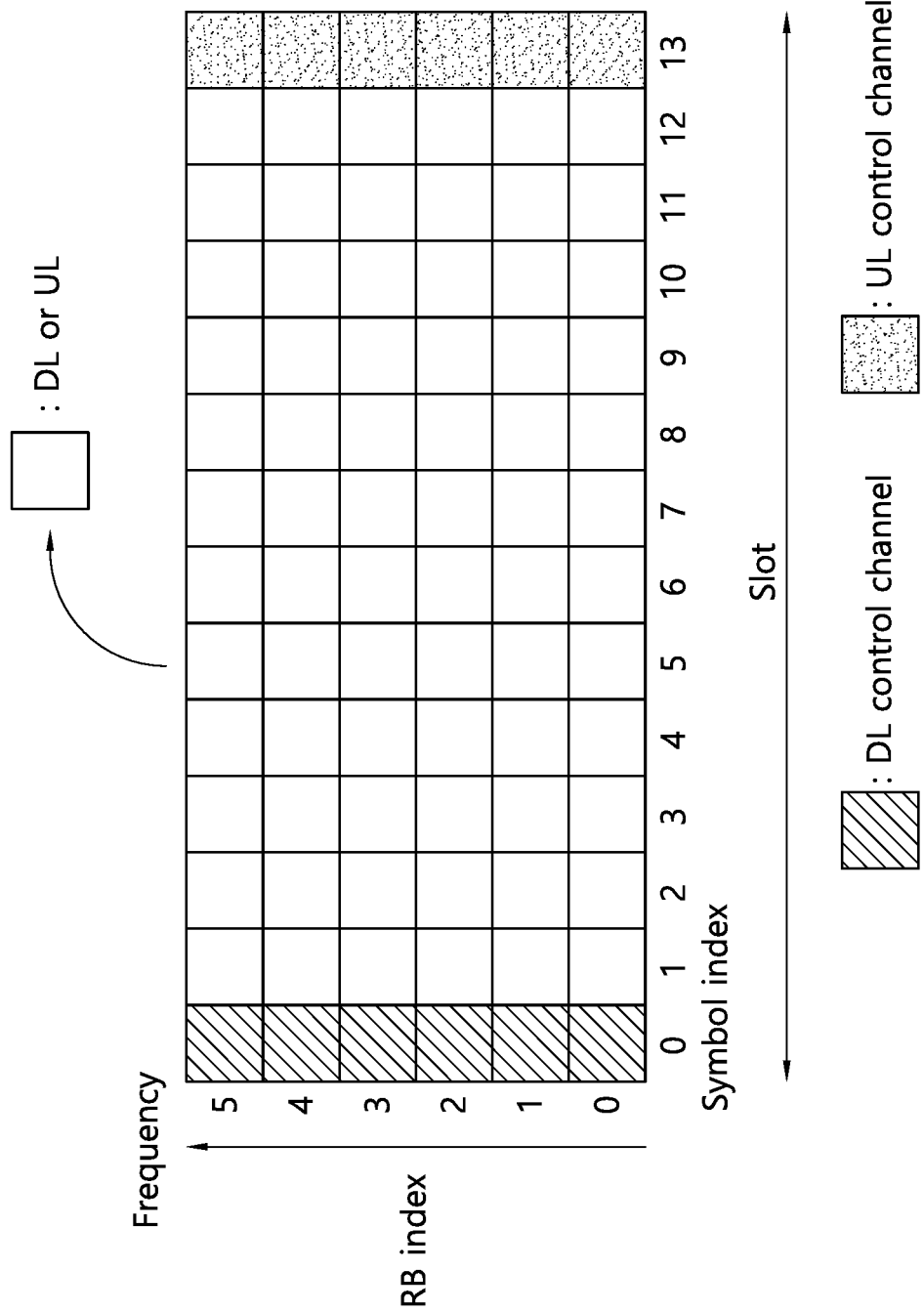
FIG. 2 shows an example of a subframe structure in an NR.

FIG. 2 shows an example of a subframe structure in an NR. The subframe structure of FIG. 2 may be used in a time division duplex (TDD) of the NR in order to minimize transmission delay of data. The subframe structure of FIG. 2 may be called a self-contained subframe structure.

Referring to FIG. 2, a first symbol of a subframe includes a DL control channel, and a final symbol includes a UE control channel. Symbols from a second symbol to a thirteenth symbol of the subframe may be used for DL data transmission or UL data transmission. As described above, when DL transmission and UL transmission are sequentially performed in one subframe, the UE may receive DL data and transmit UL hybrid automatic repeat request (HARQ)-acknowledgement (ACK) in one subframe. Finally, a time taken for retransmission upon generation of data transmission error may be reduced. Accordingly, transfer delay of final data may be minimized. In such a subframe structure, a base station and the UE may need a gap to convert a transmission mode into a reception mode or from the reception mode into the transmission mode. To this end, a partial symbol of a time point converted from DL to UL in the subframe structure may be configured as a guard period (GP).

A physical channel in the NR is described.

An antenna port is defined so that a channel on which a symbol is transported on the antenna port may be inferred from a channel on which a different symbol is transported on the same antenna port. If a large-scale characteristic of a channel to which a symbol is transferred on one antenna port may be inferred from a channel to which the symbols is transferred on a different antenna port, two antenna ports may have quasi co-located (QCL) relation to each other. The large-scale characteristic includes at least one of delay spread, Doppler diffusion, Doppler shift, average gain, average delay, and space reception parameter.

With respect to each numerology and carrier, a resource grid consisting of a plurality of subcarriers and a plurality of OFDM symbols is defined. The resource grid starts from a specific common resource block indicated by higher layer signaling. There is one resource grid per antenna port, per numerology, and per transmission direction (DL or UL). Per antenna port and per numerology, each element in the resource grid is called resource element (RE).

The resource block (RB) is defined as 12 continuous subcarriers at a frequency domain. A reference RB starts from 0 at a frequency domain to be indexed in a gradually increased direction. A subframe 0 of the reference RB is common in all numerologies. A subcarrier of an index 0 of the reference RB functions as a common reference point with respect to another RB grid. A common RB starts from 0 at a frequency domain with respect to each numerology to be indexed in a gradually increased direction. A subcarrier having an index 0 of a common RB having index 0 corresponds to a subcarrier having index 0 of the reference RB in each numerology. A physical RB (PRB) and a virtual RB are defined in a bandwidth part (BWP), and starts from 0 in the BWP to be indexed in a gradually increased direction.

The BWP is defined as a continuous group of a selected PRB in a continuous group of common RBs in a given carrier and a given numerology. The UE may be configured with maximum 4 BWPs in DL, and only one DL BWP may be activated at a given time point. It is expected that the UE does not receive a physical downlink shared channel (PDSCH), a physical downlink control channel (PDCCH), a channel state information reference signal (CSI-RS) or a tracking RS (TRS) at an outside of an activated BWP. Further, the UE may be configured with maximum 4 BWPs in UL, and only one UL BWP may be activated at a given time point. When the UE is configured with a supplemental UL (SUL), the UE may be configured with maximum 4 BWPs in SUL, and only one UL BWP may be activated at a given time point. The UE cannot transmit a physical uplink shared channel (PUSCH) or a physical uplink control channel (PUCCH) at an outside of an activated BWP.

In a DL transmission scheme at the NR, a closed loop demodulation RS (DM-RS) based spatial multiplexing is supported for a PDSCH. Maximum 8 and 12 orthogonal DL DM-RS ports support type 1 and type 2 DM-RSs, respectively. Maximum 8 orthogonal DL DM-RS ports are supported per UE with respect to single-user multiple-input multiple-output (SU-MIMO). Maximum 4 DL DM-RS ports per UE are supported with respect to multi-user MIMO (MU-MIMO). The number of SU-MIMO code-words is 1 with respect to 1-4 layer transmission and 2 with respect to 5-8 layer transmission.

The DM-RS and a corresponding PDSCH are transmitted using the same pre-coding matrix, and the UE does not need to know a pre-coding matrix in order to demodulate transmission. A transmitter may use different pre-coder matrixes with respect to different parts of a transmission bandwidth that results in a frequency selective pre-coding. Further, the UE may assume that the same pre-coding matrix is used through a group of PRBs called pre-coding RB group.

DL physical layer processing of a transmission channel is configured by following steps:

Transmission block cyclic redundancy check (CRC) attach;

Code block division and code block CRC attachment;

Channel coding: low-density parity-check (LDPC) coding;

Physical layer hybrid HARQ processing and rate matching;

Bit interleaving;

Modulation: quadrature phase shift keying (QPSK), 16 quadrature amplitude modulation (QAM), 64-QAM and 256-QAM;

Layer mapping and pre-coding;

Mapping to an assigned resource and an antenna port.

The UE may assume that at least one symbol having a DM-RS is included in each layer in which a PDSCH is transmitted to the UE. The number of DM-RS symbols and resource element mapping are configured by a higher layer. A TRS may be transmitted on an additional symbol in order to assist receiver phase track.

The PDCCH is used to schedule DL transmission on the PDSCH and UL transmission on the PUSCH. Downlink control information (DCI) on the PDCCH include following information.

DL assignment including at least modulation and coding scheme, resource assignment and HARQ information associated with DL shared channel (DL-SCH);

UL scheduling grant including at least modulation and coding scheme, resource assignment and HARQ information associated with UL shared channel (UL-SCH).

A control channel is formed by a group of control channel elements, and each control channel element consists of a set of resource element groups. Different numbers of control channel elements are collected so that different code rates with respect to the control channel are configured. Polar coding is used for the PDCCH. Each resource element group transporting the PDCCH transports a DM-RS thereof. QPSK modulation is used for the PDCCH.

In what follows, multi-RAT dual connectivity (DC) will be described. NG-RAN supports multi-RAT dual connectivity configured so that a UE in the RRC_CONNECTED state with multiple RX/TX may use radio resources provided by two separate schedulers. Multi-RAT dual connectivity is generalization of the E-UTRA dual connectivity. Two separate schedulers are located at two different NG-RAN nodes connected to each other through a non-ideal backhaul. One of the two different NG-RAN nodes performs the role of a master node (MN), and the other one performs the role of a secondary node (SN). In other words, one scheduler is located at the MN while the other scheduler is located at the SN. The two different NG-RAN nodes provide either the E-UTRA connectivity (when the NG-RAN node is an ng-eNB) or NR connectivity (when the NG-RAN node is a gNB). The ng-eNB is a node that provides the NR user plane and control plane protocol termination toward a UE and operates as an SN in the E-UTRAN-NR dual connectivity (EN-DC). The gNB is a node that provides the E-UTRA user plane and control plane protocol termination toward a UE and is connected to 5G CN through an NG interface. The MN and SN are connected to each other through a network interface, and at least the MN is connected to the core network. Although multi-RAT dual connectivity in the present disclosure has been designed based on a non-ideal backhaul between different nodes, the multi-RAT dual connectivity may also be used for an ideal backhaul.

Figure 3:
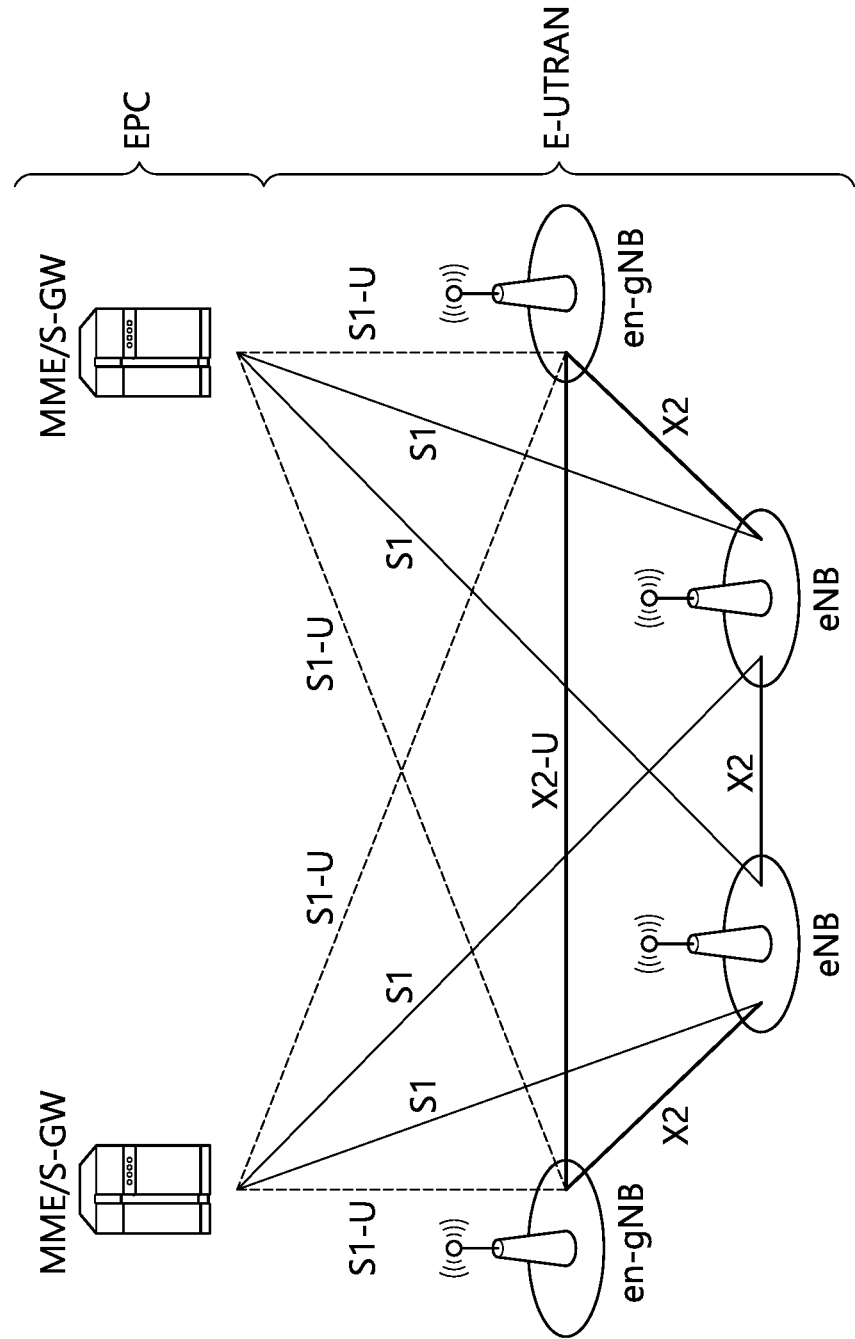
FIG. 3 shows EN-DC architecture.

FIG. 3 shows EN-DC architecture. The E-UTRAN supports multi-RAT dual connectivity through EN-DC, where a UE is connected to one eNB operating as an MN and one en-gNB operating as an SN. An eNB is connected to EPC through S1 interface and connected to en-gNB through X2 interface. The en-gNB may be connected to the EPC through S1-U interface and connected to a different en-gNB through X2-U interface.

The 5G CN also supports multi-RAT dual connectivity. An NG-RAN supports NG-RAN E-UTRA-NR dual connectivity (NGEN-DC), where a UE is connected to one ng-eNB operating as an MN and one gNB operating as an SN. The ng-eNB is connected to the 5G CN, and the gNB is connected to the ng-eNB through Xn interface. Also, the NG-RAN supports NR-E-UTRA dual connectivity (NE-DC), where a UE is connected to one gNB operating as an MN and one ng-eNB operating as an SN. The gNB is connected to the 5G CN, and ng-eNB is connected to the gNB through Xn interface.

In NR, there may be a plurality of carrier aggregation (CA) and/or DC scenarios as follows:

CA of NR and NR

DC of NR and NR

CA of NR and LTE

DC of NR and LTE

CA of LTE and LTE with short transmission time interval (TTI)

CA and/or DC of LTE with short TTI and NR

Unlike LTE, NR carriers may use different TTI lengths and use dynamic HARQ timing for various channels. For example, the timing between PDSCH and PUCCH and the timing between PDCCH and PUSCH may be dynamically indicated. Also, in NR, the timing itself may be very short. Thus, PDSCH and PUCCH may be transmitted in the same slot, and PDCCH and PUSCH may be transmitted in the same slot. This corresponds to the self-contained subframe described in FIG. 2.

With various CA/DC scenarios between LTE and NR and various timings in NR as described above, the present disclosure proposes a method for dynamically sharing power between carriers. According to the present disclosure, adverse effects on each carrier due to unknown scheduling/power information of other carriers may be minimized.

In the following description, for convenience, it is assumed that there are m carriers, m1 LTE carriers, and m2 NR carriers (i.e., m=m1+m2). Also, there are a maximum of two carrier groups (CG), and each group may include carriers for only one RAT. For example, a first CG may include LTE carriers only (i.e., LTE-CG), and a second CG may include NR carriers only (i.e., NR-CG). Also, there may be a plurality of PUCCH groups within one CG, and a PUCCH group may be defined as a group of carriers that shares the same carrier to transmit PUCCH. In the following description, it is assumed that there are no limitations, like cross carrier scheduling is not applicable between different PUCCH groups. Moreover, there may be a plurality of timing advance (TA) groups within one CG, and each TA group shares the same TA. That is, a plurality of sub CGs may be present within one CG according to various criteria. In the following description, TTI, scheduling interval, and scheduling unit may be interchangeably used.

Guaranteed power may be proposed to enable power sharing and minimize the effects of CGs on each other. The total power for UE shall be limited to the maximum UE power due to power limitations even when a plurality of carriers are aggregated. When a plurality of carriers are aggregated, the total UE power may be shared between RATs regardless of RAT type. The guaranteed power for each CG may be shared so that the sum thereof does not exceed the maximum UE power.

The following may be taken into consideration for power sharing between two CGs.

(1) No power sharing between two CGs: Each CG is permitted to use up to configured guaranteed power. Before the second CG is configured, the following may be taken into consideration from the point of view of the first CG.

The guaranteed power for the first CG may be preconfigured regardless of whether the second CG is configured or not. Thus, the maximum power for the first CG is limited regardless of whether the second CG is configured or not.

The first CG is permitted to use up to the maximum UE power before the second CG is configured. Once the second CG is configured, the guaranteed power for the second CG is excluded from the maximum UE power, and the first CG may use the remaining power.

The guaranteed power between two CGs may be updated dynamically and/or semi-statically. Regardless of the state (e.g., DRX (discontinuous reception) or DL slot) of the other CG, each CG cannot use more than the configured guaranteed power. That is, from the point of view of each CG, guaranteed power may replace the maximum UE power, and every power calculation may be performed independently within a CG.

(2) Limited power sharing based only on semi-static configuration: If there is a possibility that a UL transmission (including a sidelink transmission) will occur in the other CG, each CG is permitted to use up to configured guaranteed power. However, if there is no possibility that UE will use the guaranteed power configured in one CG for a given amount of time from a specific time point, the other CG may borrow and use the corresponding power based on a semi-static configuration. Therefore, the other CG may use more than the configured guaranteed power. The semi-static configuration may include a semi-static resource pool configuration of sidelink, a semi-static resource configuration for UL, a grant-free semi-static resource configuration, a semi-static resource configuration for a physical random access channel (PRACH), a DRX configuration, and so on. Moreover, in order for a certain CG to borrow power from the other CG, it can be ensured that there is no transmission from the other CG for a certain amount of time of a given channel. If there is a possibility that a UL transmission will occur in the middle of the given channel, power cannot be borrowed from the other CG.

(3) Power sharing of the remaining power based on dynamic information: It is an extension of the above (2), in which case, if UE determines that there is no UL transmission in one CG at a specific time point, power may be shared between each CG. That is, UE may determine the presence or absence of a UL transmission in one CG at a specific time point based on dynamic information, and, if there is no UL transmission in the corresponding CG, the power for the corresponding CG may be used for UL transmission in the other CG. For example, if the UE knows that there is no grant-free transmission on a configured grant-free resource, the power allocated for grant-free transmission may be used for other transmissions.

For example, a reference TDD configuration for LTE may be configured for UE through an upper layer. In this instance, if the UE does not indicate dynamic power sharing capability to a network, and a corresponding subframe on the MCG of LTE is a UL subframe according to the reference TDD configuration, the UE may not perform UL transmission in a slot on the SCG of NR. If the UE can perform dynamic power sharing, UL transmission on the MCG overlapping UL transmission on the SCG may not be scheduled.

If power is shared dynamically according to the above (3), there is a need to clearly define how to determine whether there is no UL transmission in the other CG. Particularly, there may be a problem that each CG uses different numerologies.

Figure 4:
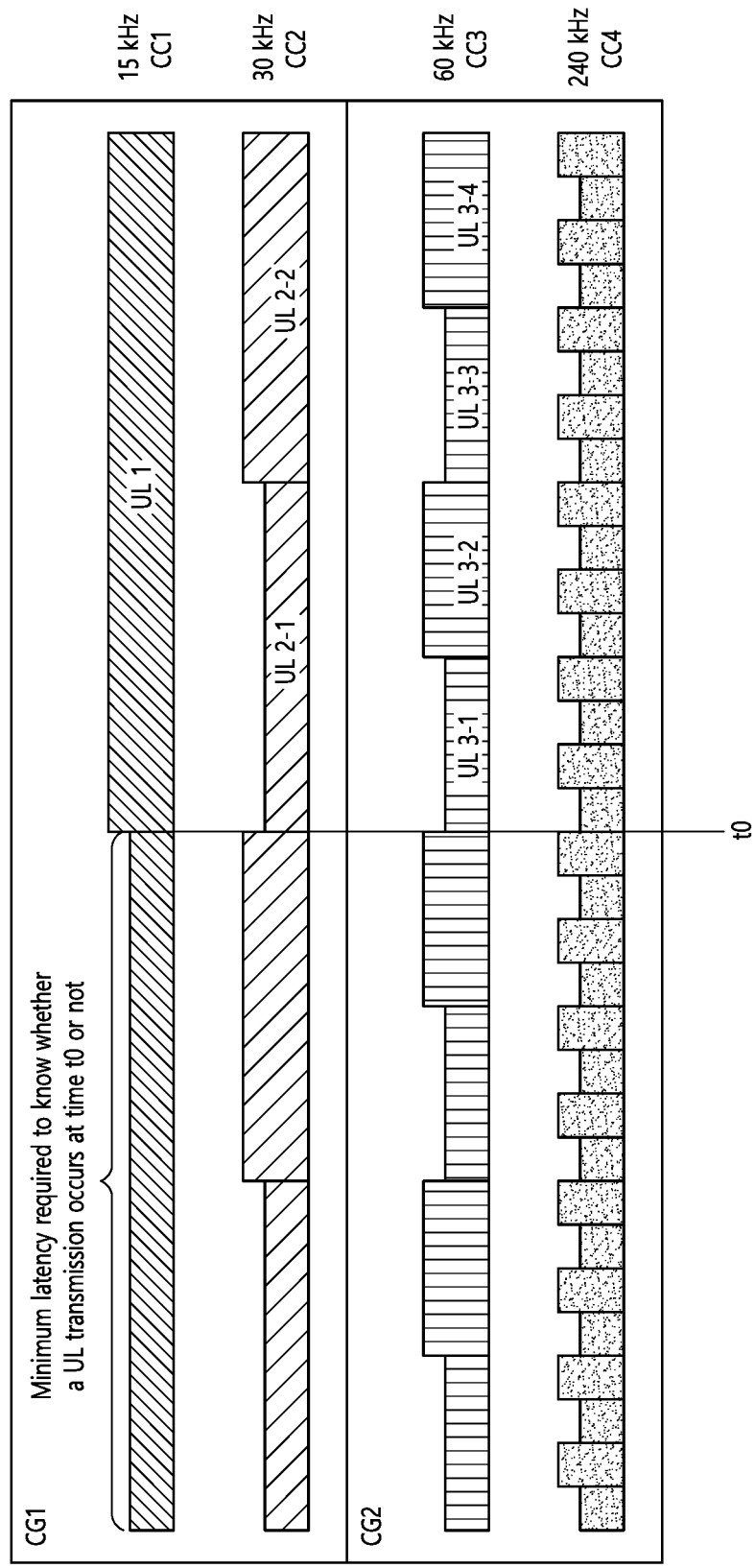
FIG. 4 shows an example of CGs using different numerologies according to an embodiment of the present disclosure.

FIG. 4 shows an example of CGs using different numerologies according to an embodiment of the present disclosure. Referring to FIG. 4, CG1 includes CC1 and CC2, CC1 is a CC that uses a numerology corresponding to a subcarrier spacing of 15 kHz, and CC2 is a CC that uses a numerology corresponding to a subcarrier spacing of 30 kHz. Also, CG2 includes CC3 and CC4, CC3 is a CC that uses a numerology corresponding to a subcarrier spacing of 60 kHz, and CC4 is a CC that uses a numerology corresponding to a subcarrier spacing of 240 kHz.

From the point of view of CC1, it can be assumed that a minimum latency required to know whether a UL transmission occurs at time point t0 or not is about 1 slot based on scheduling intervals or the like. When UE determines the power for UL transmission in the slot UL1 of CC1, there is a need to take account of the potential power required for the slots UL2-1 and UL2-2, the slots UL3-1, UL3-2, UL3-3, and UL3-4 of CC3, and the UL slots of CC4. That is, in determining the power for UL transmission of CC1, there is a need to take account of the potential power required for UL transmission in different carriers CC2, CC3, and CC4 having a shorter scheduling interval (i.e., a longer subcarrier spacing). Since the minimum processing time of CC1 is longer than the minimum processing time of the other CG, dynamic power sharing may not be used in determining the power for UL transmission of CC1. That is, if potential UL transmission is possible in CG2 having a shorter scheduling interval, CG1 cannot borrow the guaranteed power for CG2 from CG2. On the contrary, in determining the power for UL transmission of CC3, if there is no UL transmission at t0, it can be ensured that there is no UL transmission in the slots UL1, UL2-1, and UL2-2 of CG1. This is because the scheduling interval of CG1 is longer than the scheduling interval of CG2. That is, if a carrier or CG having a shorter minimum processing time or shorter scheduling interval has no scheduled UL transmission, they may use the guaranteed power for a carrier or CG having a longer minimum processing time or longer scheduling interval.

Figure 5:
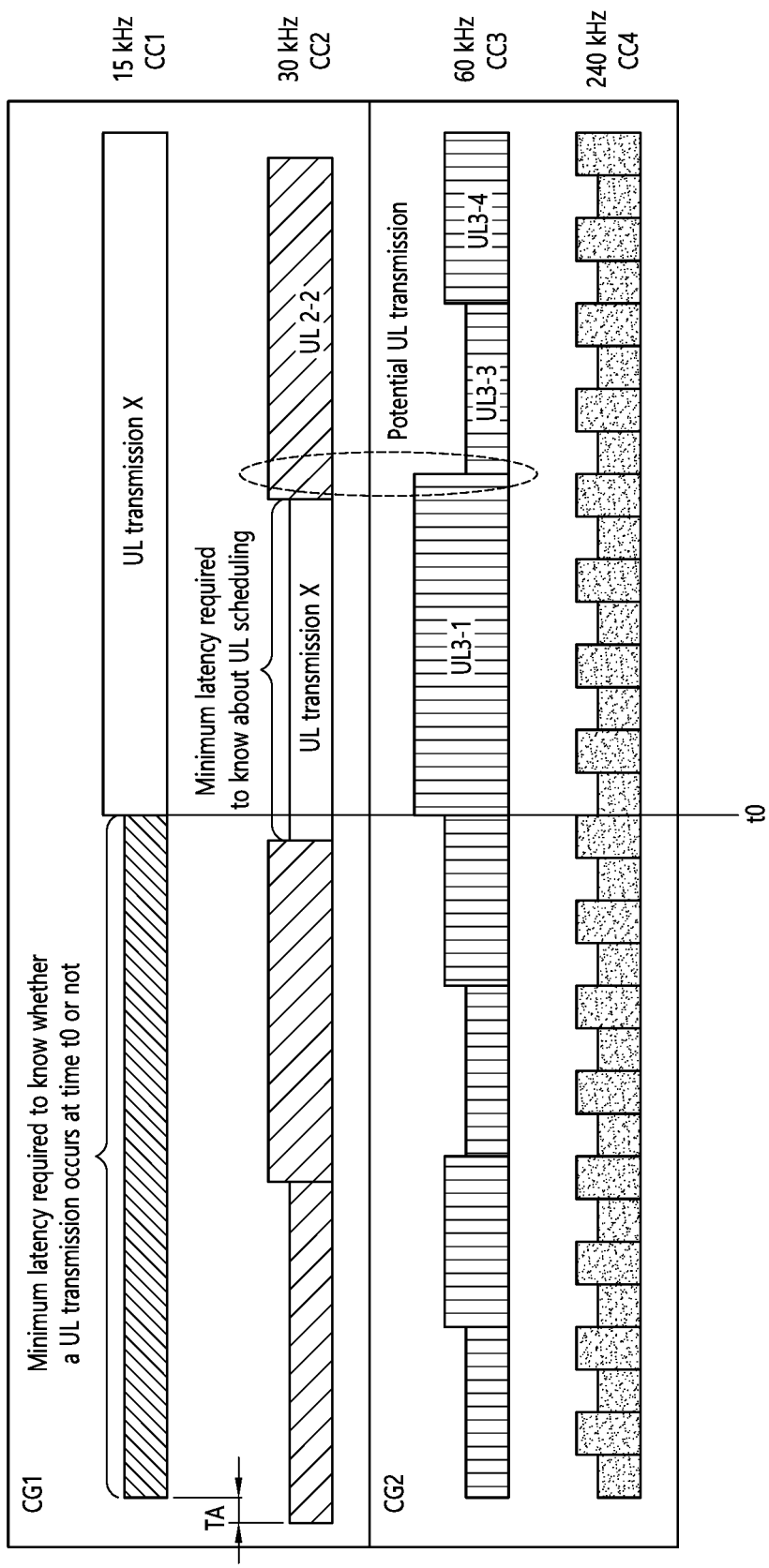
FIG. 5 shows an example of CGs using different numerologies and different TAs according to an embodiment of the present disclosure.

FIG. 5 shows an example of CGs using different numerologies and different TAs according to an embodiment of the present disclosure. When determining whether there is a UL transmission in other carriers or CGs, TA, too, has to be taken into consideration. Referring to FIG. 5, in determining the power for UL transmission in the slot UL3-1 of CC3, the guaranteed power for CG1 may be used if there is no UL transmission in CG1. However, since the UL transmission in the slot UL3-1 spans a plurality of slots, there is a need to take account of potential UL transmission in the plurality of slots. Based on UL scheduling information at time point t0, UE is able to know that there is a scheduled UL transmission in the slot UL2-2 overlapping the end of the slot UL3-1. This takes the TA of CC2 into account (the slot UL3-1 and the slot UL2-2 do not overlap if the TA is not taken into account). Therefore, the UE cannot use the guaranteed power for CG1 in determining the power for UL transmission in the slot UL3-1 of CC3.

If a self-contained subframe is used, a minimum latency required to know UL scheduling information may be shorter than the slot length. For example, a minimum latency required to know UL scheduling information may be one or several OFDM symbols.

Figure 6:
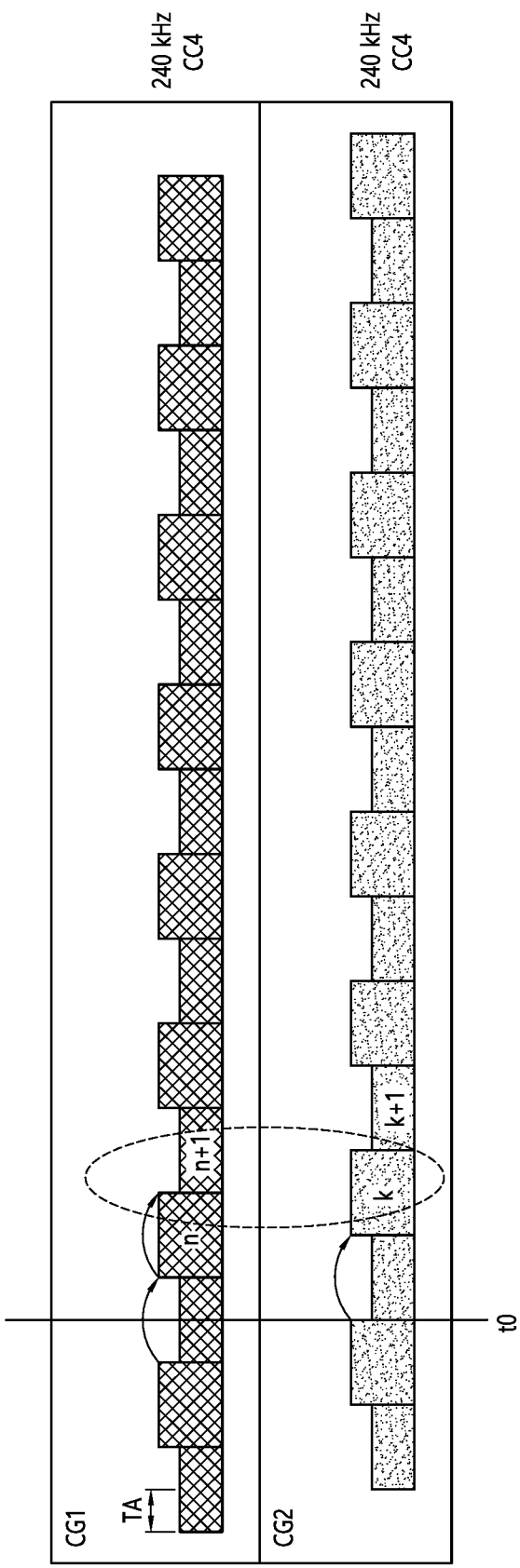
FIG. 6 shows an example of CGs using the same numerology and different TAs according to an embodiment of the present disclosure.

FIG. 6 shows an example of CGs using the same numerology and different TAs according to an embodiment of the present disclosure. Referring to FIG. 6, if a plurality of TAs are configured, the slots between two carriers are not aligned but may only partially overlap even if the same numerology is used. In this case, when determining the power for UL transmission in the slot k of CG2, there is a need to take account of the power for UL transmission in the slots n and n+1 of CG1. However, when UE determines the power for UL transmission in the slot K at time point t0, the scheduling information in the slot n+1 and the power for UL transmission are not known at time point t0. Therefore, CG2 cannot assume that there will be no UL transmission in CG1 so long as CG1 and CG2 have a similar minimum processing time or similar minimum scheduling interval and there is potential UL transmission in the slot n+1 of CG1.

Accordingly, the condition for using power control mode 1, which is a power control mode for the synchronous mode of DC, should be clearly defined. To this end, the following may be taken into consideration.

(1) If the timing difference between two CGs is equal to or less than X % (e.g., 5%) of the slot length, scheduling interval length, or TTI length, a partial overlap between the slot k and the slot n+1 may be handled by UE implementation. Thus, the condition for using the configuration of power control mode 1 may vary depending on the numerology used by each CG or the slot length/scheduling interval length/TTI length.

(2) Power adjustment may not be performed on a carrier whose power adjustment part exceeds X % (e.g., 5%). For example, if a slot mapped at a subcarrier spacing of 15 kHz and another slot mapped at a subcarrier spacing of 15 kHz overlap with a timing difference of 33 us, the power for UL transmission in the slots mapped at a subcarrier spacing of 15 kHz may be adjusted. On the contrary, the power for UL transmission in a slot mapped at a subcarrier spacing of 60 kHz may not be adjusted. For example, a slot having an sTTI of 2 OFDM symbols and a slot having a TTI of 14 OFDM symbols overlap in a plurality of TA groups (TAGs), power adjustment may be performed only in the slot having a longer TTI but not in the slot having a shorter TTI. That is, the same power may be used for at least 100−X % of a specific transmission.

(3) If there is a timing difference between two CGs regardless of the size of the timing difference, the guaranteed power for the other CG may not be borrowed due to a potential transmission in the slot n+1. This means that power control mode 1 cannot be configured unless the two CGs are completely aligned. However, as long as UE ensures that there is no UL transmission in the slot n+1 due to a longer scheduling interval or DRX or configuration in CG1, the UE may borrow the guaranteed power for CG1 when determining the power for UL transmission in CG2.

Figure 7:
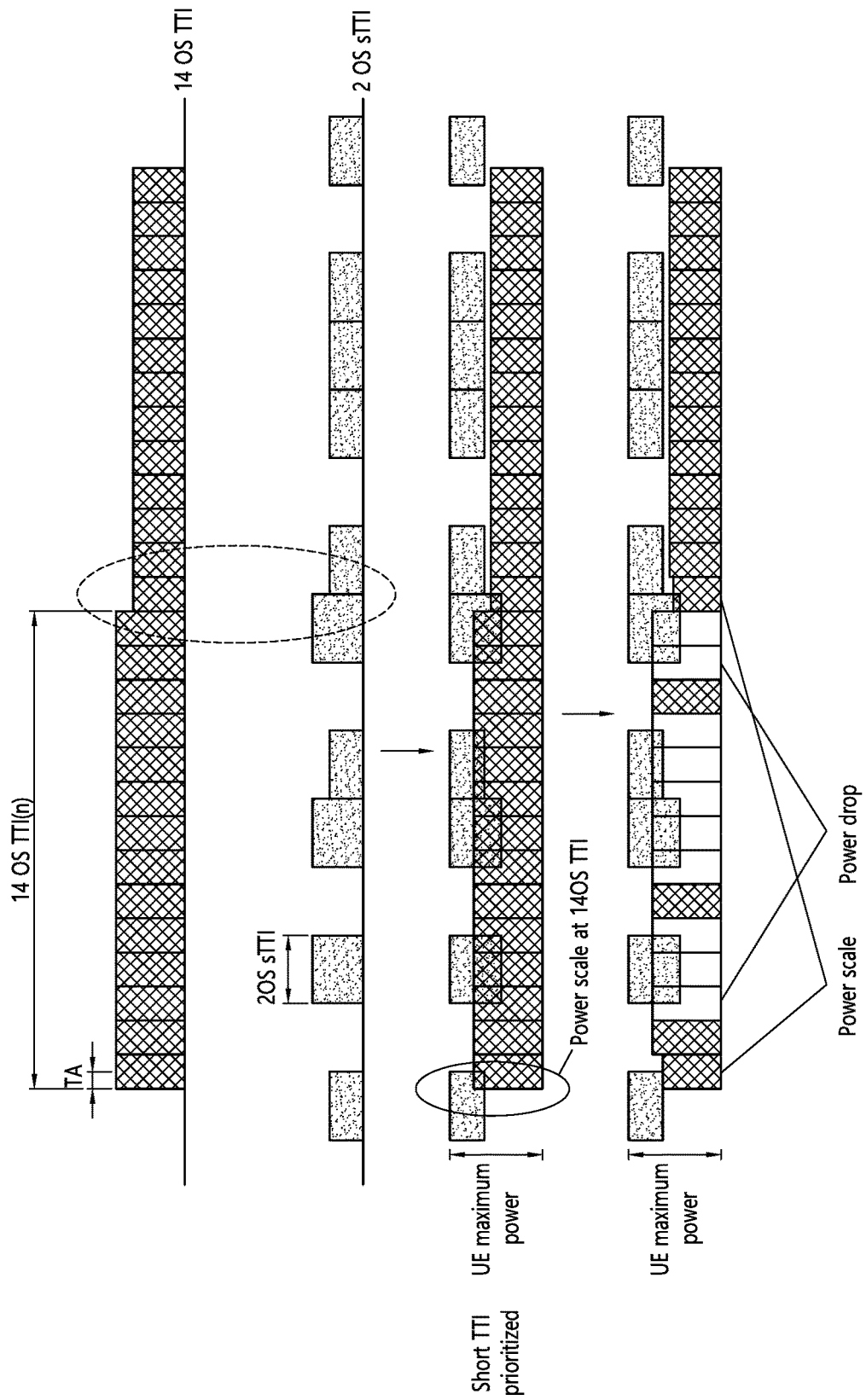
FIG. 7 shows an example of power sharing according to an embodiment of the present disclosure.

FIG. 7 shows an example of power sharing according to an embodiment of the present disclosure. FIG. 7 illustrates that power adjustment is not performed on a carrier whose power adjustment part exceeds X %. Referring to FIG. 7, a slot having a TTI of 14 OFDM symbols and a slot having an sTTI of 2 OFDM symbols partially overlap by having different TAs. In this case, the power in the entire nth slot having 14 OFDM symbols or in the first OFDM symbol thereof. The overlap is relatively small from the point of view of the slot having a TTI of 14 OFDM symbols, power adjustment may be performed in such a way that the maximum UE power is not exceeded. On the contrary, if the overlap exceeds X %, the corresponding transmission may be omitted. Since the overlap is relatively large from the point of view of the lot having an sTTI of 2 OFDM symbols, power adjustment is not performed. In other words, if an overlap between slots having different TTIs is less than X % of UL transmission, power adjustment may be performed in such a way that the maximum UE power is not exceeded. Otherwise, the omission of UL transmission may be taken into consideration if at least discrete Fourier transform spread OFDM (DFT-s-OFDM) is used. In a case where OFDM is used, the same mechanism may be applied, or power adjustment at an OFDM symbol level may be taken into consideration.

The same issue may occur between CGs having different numerologies. In this case, the foregoing description may be modified as follows.

(1) If the timing difference between two CGs is equal to or less than X % of a slot length corresponding to the largest subcarrier spacing used in the two CGs or the shortest scheduling interval length or shortest TTI length used in the two CGs, a partial overlap between the slot k and the slot n+1 may be handled by UE implementation.

(2) If there is a timing difference between two CGs regardless of the size of the timing difference, the guaranteed power for the other CG may not be borrowed due to a potential transmission in the slot n+1. However, as long as UE ensures that there is no UL transmission in the slot n+1 due to a longer scheduling interval or DRX or configuration in CG1, the UE may borrow the guaranteed power for CG1 when determining the power for UL transmission in CG2.

To maximize dynamic power sharing, the following limitations may be taken into consideration when performing scheduling.

Unless there is no data for UE to transmit through a grant-free resource, if the UE is scheduled for PUSCH transmission between the slots n+1 and n−k, the UE may assume that there is no scheduling between the slots n−k+1 and n from the network. However, if the UE supports mini-slot-based scheduling or other scheduling intervals (for example, slot-based scheduling/mini-slot-based scheduling), this assumption may not be maintained.

In DRX, UE does not need to transmit UL data unless there is UL data to transmit.

UE does not need to transmit UL data in a transmission gap or any other gaps. The transmission gap may affect a DL carrier when the UE performs synchronization on a given UL carrier. If a plurality of transmission gaps are configured, e.g., different transmission gaps are configured for each subcarrier or CG, only a UL carrier connected to a DL carrier having a transmission gap may not transmit UL data during the transmission gap.

In a slot structure indicated by a group common PDCCH, a DL-type slot may be used only for DL, but cannot be changed to a UL-type slot by dynamic scheduling. For example, in the above FIG. 4, if UE knows that the type of the slot UL2-2 is DL by the group common PDCCH, the UE can ensure that there is no UL transmission in this slot since the type of this slot cannot be changed to UL. Accordingly, the UE may borrow the guaranteed power for CG1 when determining the power for UL transmission in CG2.

In a slot structure indicated by a semi-static configuration, it can be assumed that there is no UL transmission in a fixed DL type.

If the group common PDCCH is successfully detected, the structure indicated by the group common PDCCH may be used. Otherwise, a fallback configuration may be used, or any assumption on the slot structure may not be made.

A potential UL transmission may include a PUSCH transmission by grant, a grant-free PUSCH transmission, a PUCCH transmission for HARQ-ACK and CSI, a sounding reference signal (SRS), an additional feedback report, and a PRACH transmission.

As described above, the timing difference between different carriers or CGs having a short scheduling interval may have a larger effect compared to LTE. Thus, when CA/DC between NR carriers is taken into consideration, the timing difference may likewise have a larger effect on a numerology having a longer subcarrier spacing (e.g., 60/120/240 kHz). From this point of view, a sub CG for performing guaranteed power or power sharing may be configured within a CG to minimize the effect of the timing difference. That is, guaranteed power may be used between carriers having different TTIs, too. In this case, since there are two or more carriers, guaranteed power may be allocated to two or more groups. One sub CG may be configured to have the same numerology or the same scheduling interval.

To sum up the above-described present disclosure, if carriers or CGs having different scheduling intervals or different numerologies are aggregated by CA or synchronous DC, the following power sharing mechanism may be taken into consideration.

(1) Priority on early transmission: Power may be dynamically shared, and power may be allocated first for early transmission. However, there is a need to clearly define what early transmission is, considering processing time or the like.

(2) Priority on numerology having a short scheduling interval or a longer subcarrier spacing: Power may be allocated first for UL transmission through a slot corresponding to a numerology having a short scheduling interval or a longer subcarrier spacing. However, there is a need to limit power to some extent, because a carrier or CG having a longer scheduling interval is not aware of a UL transmission in a carrier or CG having a short scheduling interval. For example, when there is a need to limit power, the entire or some of a UL transmission in a carrier or CG having a longer scheduling interval may be omitted, or power adjustment may be required for an overlap.

(3) Guaranteed power: Guaranteed power may be allocated for each carrier or CG having a different scheduling interval or different numerology. If at least a potential UL transmission (i.e., overlapping transmission) is likely to occur, guaranteed power cannot be used for other carriers or CGs. Similarly to the allocation of guaranteed power between CGs, if UE ensures that there is no overlapping UL transmission by a semi-static configuration or dynamic signaling, the UE may use the unused power or guaranteed power for a certain carrier or CG for UL transmission of other carriers or CGs.

Figure 8:
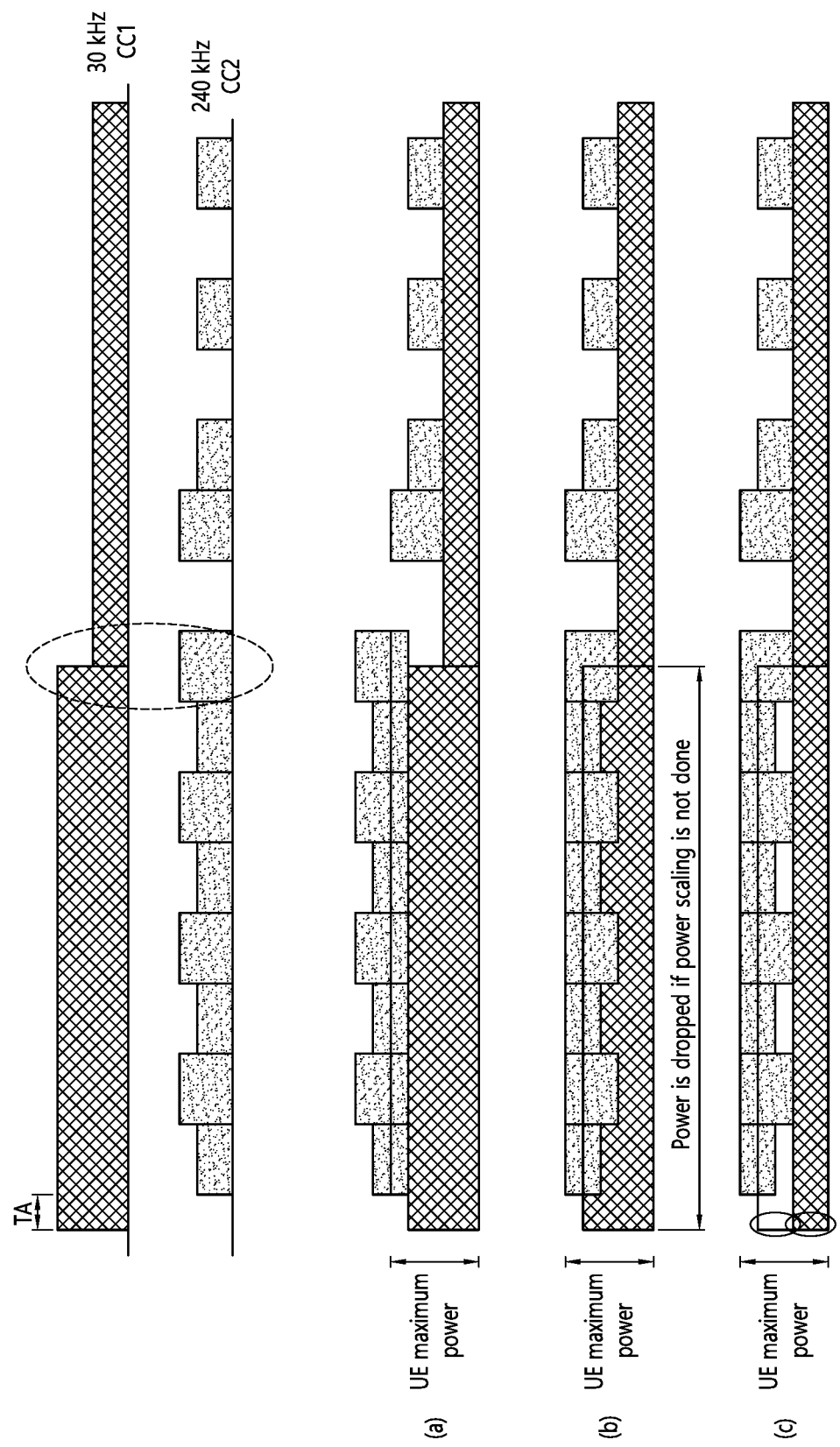
FIG. 8 shows another example of power sharing according to an embodiment of the present disclosure.

FIG. 8 shows another example of power sharing according to an embodiment of the present disclosure. FIG. 8 illustrates a power sharing mechanism between carriers or CGs having different scheduling intervals or different numerologies according to an embodiment of the present disclosure. Referring to FIG. 8, a UL transmission in CC1 having a subcarrier spacing of 30 kHz and a UL transmission in CC2 having a subcarrier spacing of 240 kHz partially overlap.

FIG. 8-(a) illustrates a case that power is allocated first for early transmission as described above in (1). Since UL transmission in CC1 is scheduled earlier than UL transmission in CC2, the power for UL transmission in CC1 may be used as it is, and the maximum UE power minus the power for UL transmission in CC1 may be used for UL transmission in CC2.

FIG. 8-(b) illustrates a case that power is allocated first for UL transmission through a slot corresponding to a numerology having a short scheduling interval/s TTI or a longer subcarrier spacing s described above in (2). Since CC2 has a longer subcarrier spacing than CC1, the power for UL transmission in CC2 may be fully used, and the maximum UE power minus the power for UL transmission in CC2 may be used for UL transmission in CC1.

FIG. 8-(c) illustrates a case that the guaranteed power is allocated as described above in (3). Guaranteed power is allocated for UL transmission in CC1 and UL transmission in CC2.

Below is a description of what needs to be more clearly defined when power is allocated first for early transmission as described above in (1).

Figure 9:
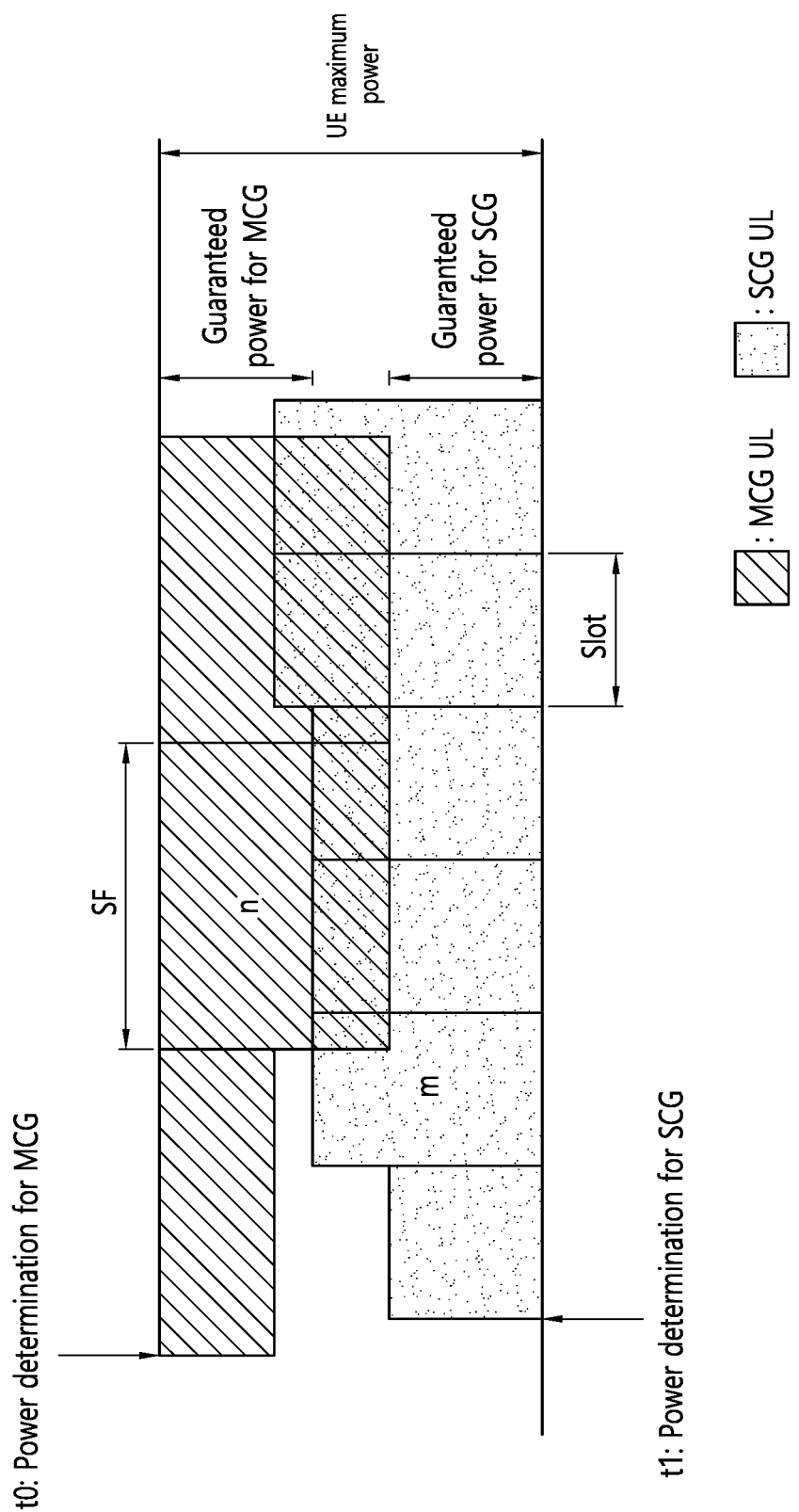
FIG. 9 shows an example of CGs using different numerologies according to an embodiment of the present disclosure.

FIG. 9 shows an example of CGs using different numerologies according to an embodiment of the present disclosure. Referring to FIG. 9, it is assumed that a master cell group (MCG) uses a subcarrier spacing of 15 kHz and a secondary cell group (SCG) uses a subcarrier spacing of 30 kHz. Thus, the MCG and the SCG have different slot lengths. The EN-DC described above in FIG. 3 may be an embodiment. Assuming that the power for UL transmission may be determined or changed one subframe or one slot before actual UL transmission, UE may have multiple time points at which the power for UL transmission has to be determined. Referring to FIG. 9, t0 is a time point at which the power for the subframe n of the MCG has to be determined, and t0 is a time point at which the power for the slot m of the SCG has to be determined. Because the UE may not know information about the power in the slot m at time point t0, the UE cannot allocate the remaining power to the subframe n although the slot m precedes the subframe n. Therefore, UE cannot allocate remaining power to slot m at time point t1. From this point of view, early transmission may be defined based on power determination time and/or processing time, rather than by actual UL transmission time.

Figure 10:
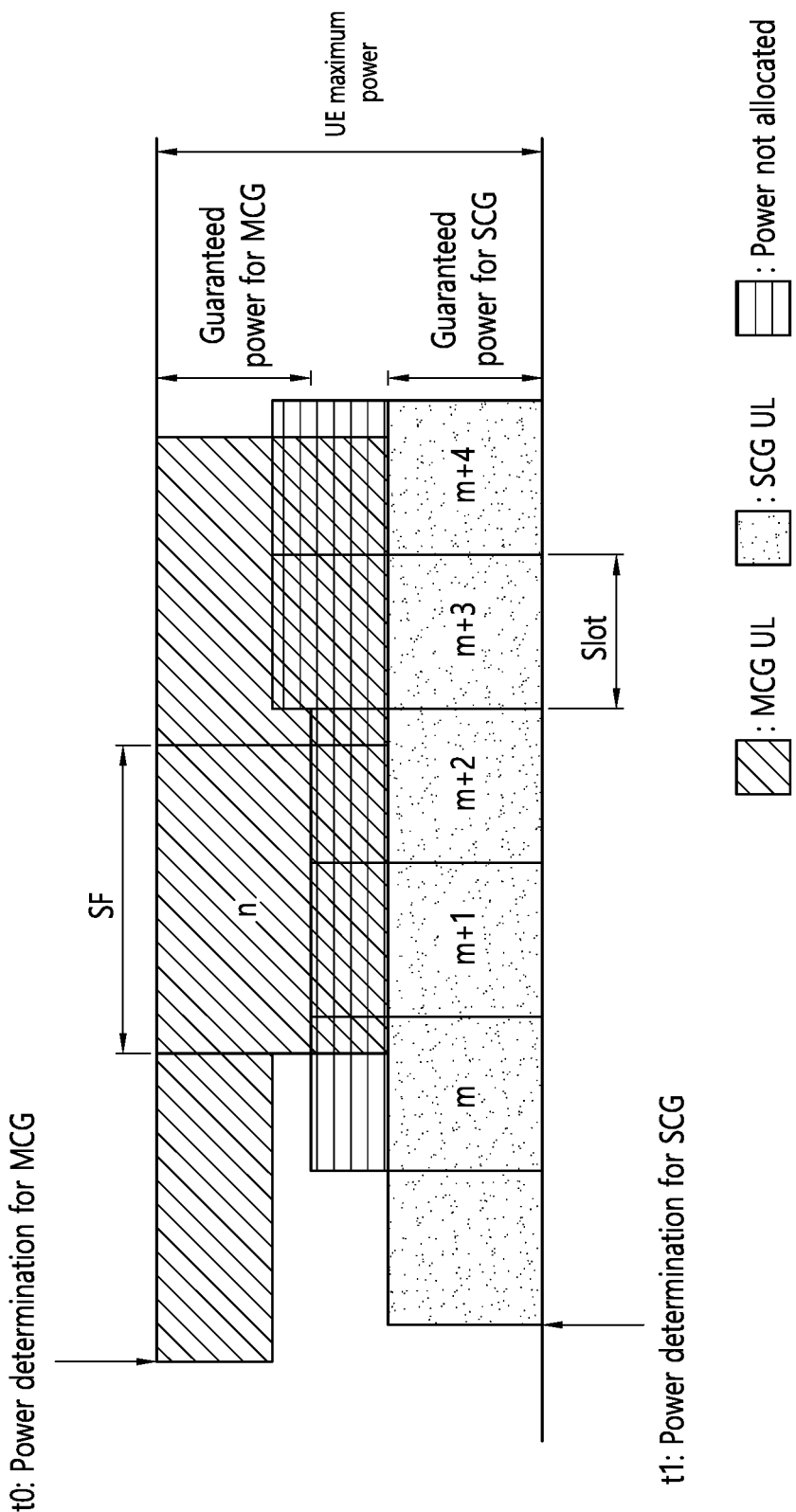
FIG. 10 shows an example of allocating power first to early transmission according to an embodiment of the present disclosure.

FIG. 10 shows an example of allocating power first to early transmission according to an embodiment of the present disclosure. Referring to FIG. 10, since the time point t0 for determining the power for the subframe n of the MCG is earlier than the time point t1 for determining the power for the slot m of the SCG, the power for UL transmission of the MCG is allocated first.

This problem may occur regardless of EN-DC or multi RAT DC. Also, a similar problem may occur to CA between NR carriers having different numerologies and/or different processing times. Generally, it is preferable that the UE allocates power first for early transmission in consideration of power determination time and/or processing time, in order to design a simpler power sharing mechanism.

Moreover, if a particular carrier or CG does not use guaranteed power, there is an issue with the use of guaranteed power for the corresponding carrier or CG. For example, if the corresponding carrier or CG is in DRX state, or is configured with DL subframes/slots, or there is no UL scheduling, the particular carrier or CG do not use guaranteed power. It is apparent that semi-statically configured resources such as DRX or semi-statically configured DL subframes/slots will not be dynamically changed, and therefore the guaranteed power in the corresponding state may be used for UL transmission in other CGs. On the contrary, in order to use the power for other CGs based on a slot structure indicated by a group common PDCCH or based on dynamic signaling such as a UL grant, processing time should be further taken into consideration. For example, if a self-contained frame is configured, a UL grant may be transmitted only several OFDM symbols before actual UL transmission. Therefore, the guaranteed power for UL transmission of a certain CG may be used for UL transmission of other CGs, only when UE ensures that there will be no UL transmission, based on that the certain CG will not have any UL grant in a semi-static configuration or the next overlapping UL part.

Figure 11:
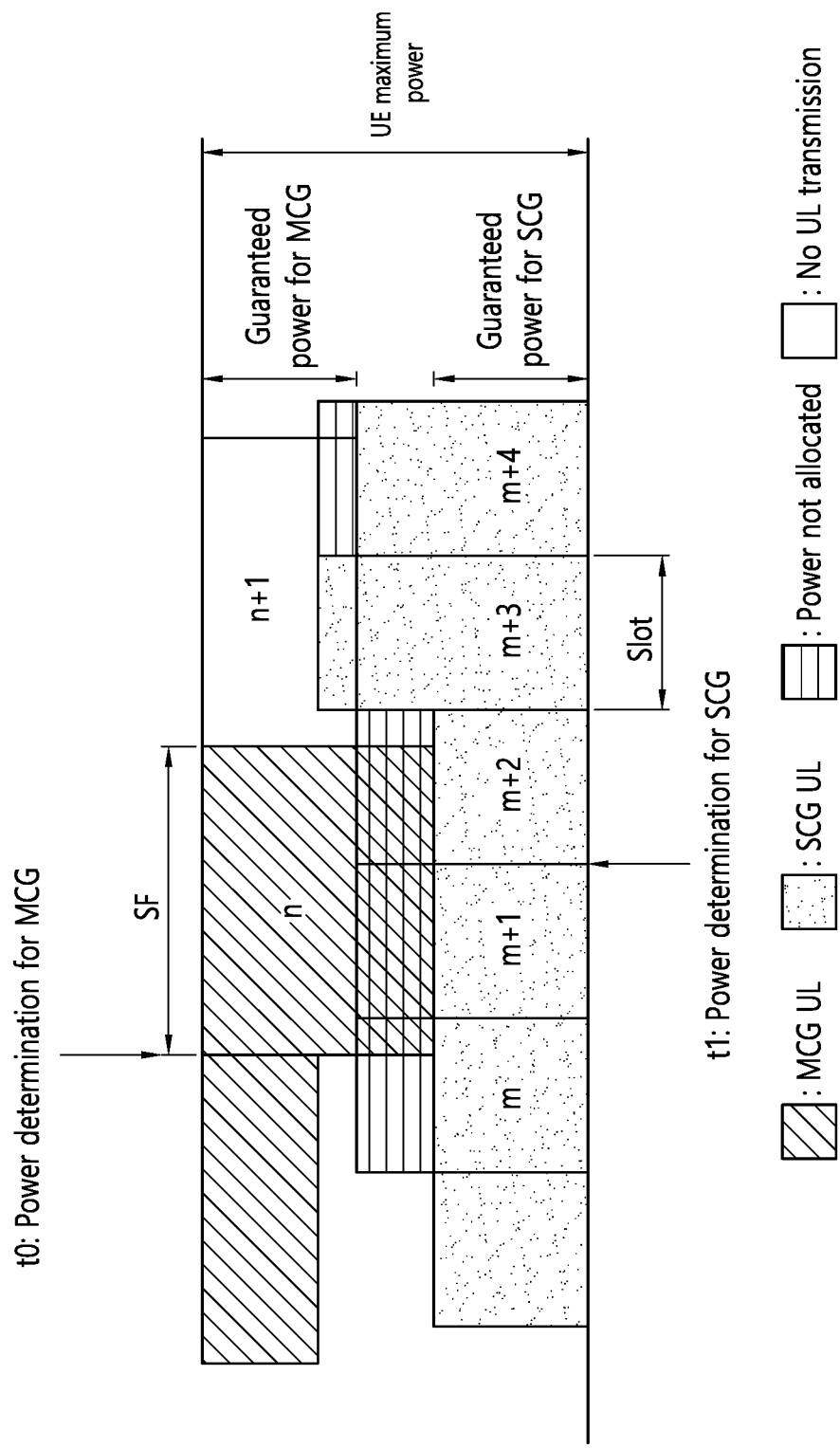
FIG. 11 shows another example of power sharing according to an embodiment of the present disclosure.

FIG. 11 shows another example of power sharing according to an embodiment of the present disclosure. Referring to FIG. 11, UE is able to know that there is no UL transmission in the subframe n+1 of the MCG at the time point t1 for determining the power for the slot m+3 of the SCG. Thus, the UE can borrow the guaranteed power for the MCG for the UL transmission of the SCG. In the slot m+4 of the SGG, the UE cannot borrow the guaranteed power for the MCG for the UL transmission of the SCG, as long as there is UL transmission in the subframe n+2 of the MCG.

Figure 12:
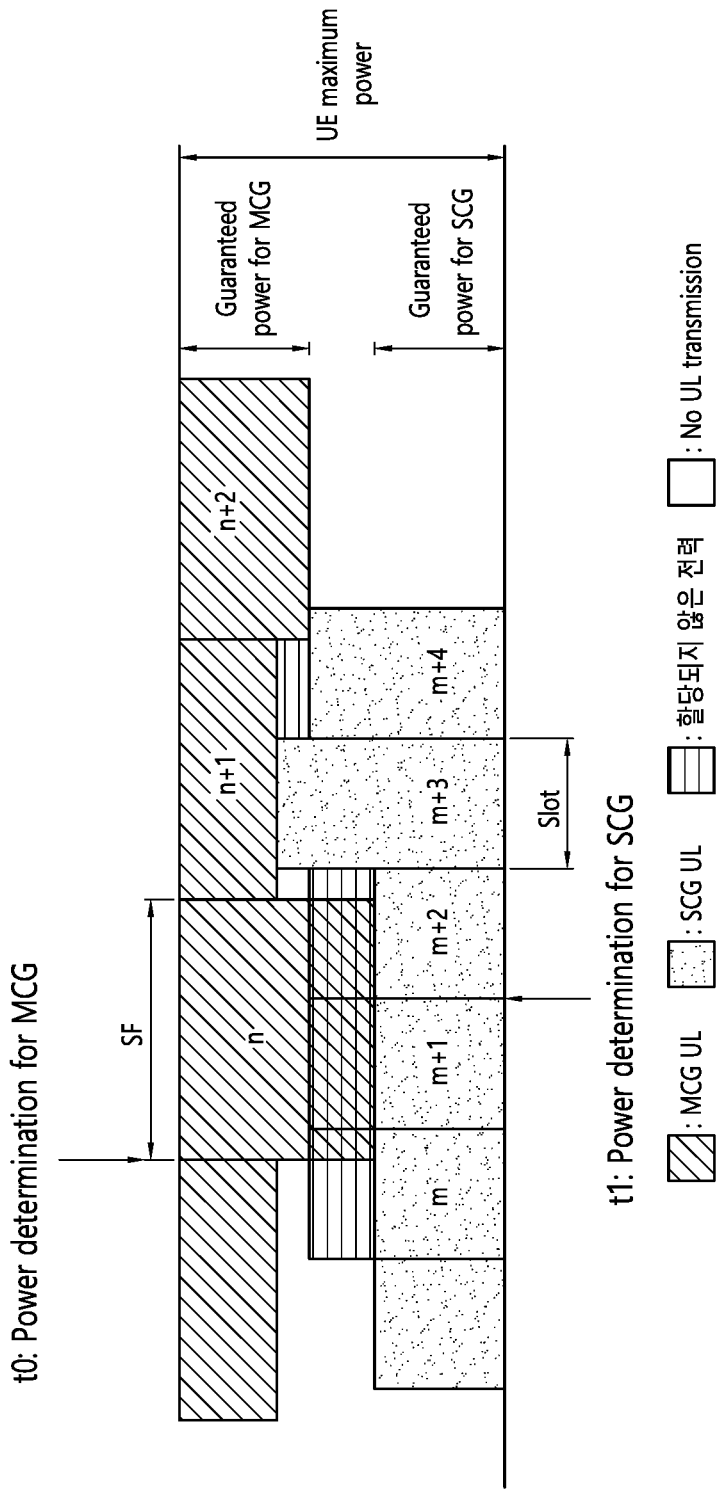
FIG. 12 shows another example of power sharing according to an embodiment of the present disclosure.

FIG. 12 shows another example of power sharing according to an embodiment of the present disclosure. Referring to FIG. 12, even when there is a UL transmission in the subframe n+1 of the MCG, the power not used in the MCG may be used for UL transmission in the slot m+3 of the SCG, if the power requested for UL transmission in the subframe n+1 is smaller than the guaranteed power for the MCG. That is, if UE can look ahead due to the difference in processing time between CGs, the UE may use the power not used by any of the CGs for UL transmission in the other CG, regardless of synchronous/asynchronous DC.

The following may be taken into consideration in defining the look-ahead capability of UE. Specifically, whether UE in the slot m of a certain CG is able to look ahead to the slot n of other CGs may be defined by any of the following:

(1) Based on the time point of transmission of scheduling information containing a transmit power control (TPC) command: If the time point of transmission of scheduling information on the slot m including a TPC command is later than or equal to the time point of transmission of scheduling information on the slot n including a TPC command, the UE may be defined as having the capability of looking ahead to the slot n when determining the power for UL transmission in the slot m.

(2) Based on the time point of power allocation: If the time point of power allocation for the slot m is later than or equal to the time point of power allocation for the slot n, the UE may be defined as having the capability of looking ahead to the slot n when determining the power for UL transmission in the slot m.

(3) The UE may not be assumed to have any look-ahead capability, except information provided through a semi-static configuration in DC (at least EN-DC). That is, any dynamic power sharing based on dynamic scheduling may not be used.

(4) Based on at least the timing from the DCI to PUSCH or from PDSCH to PUCCH: For example, RAT or CG having small corresponding timing may be given priority.

Figure 13:
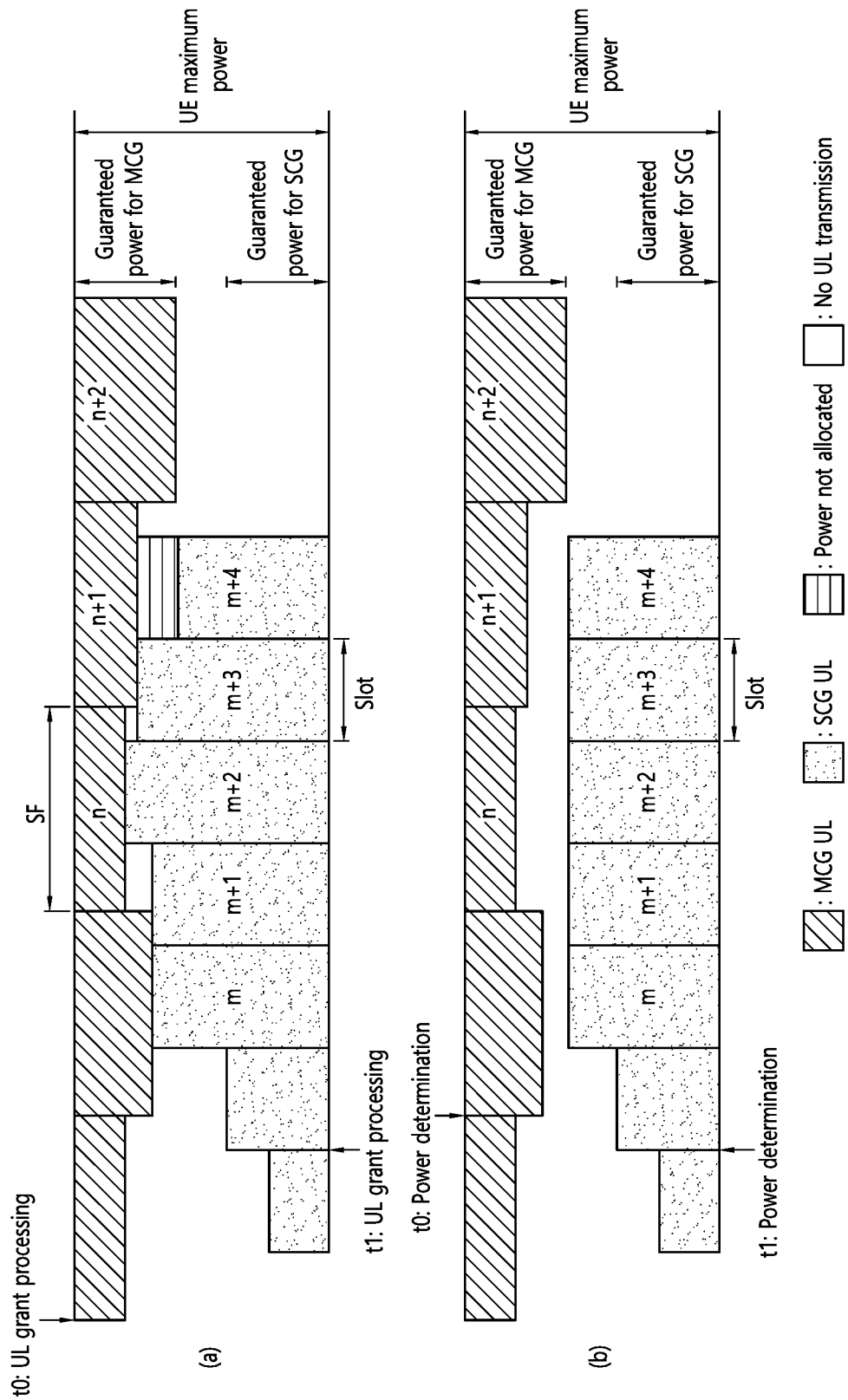
FIG. 13 shows another example of power sharing according to an embodiment of the present disclosure.

FIG. 13 shows another example of power sharing according to an embodiment of the present disclosure. FIG. 13-(a) illustrates a case that UE's look-ahead capability is defined based on the time point of transmission of scheduling information containing a TPC command described in above (1) in relation to look-ahead capability. Referring to FIG. 13-(a), a UL grant for the slot n of the MCG is transmitted at time point t0, and a UL grant for the slot m of the SCG is transmitted at time point t1. In this case, since t0 is earlier than t1, the UE may be defined as having the capability of looking ahead to the slot n in determining the power for UL transmission in the slot m. Accordingly, even if there is a UL transmission in the slot n of the MCG, the UE may use the remaining unused power for UL transmission in the slots m+1, m+2, and m+3 of the SCG because the requested power is smaller than the guaranteed power for the MCG.

FIG. 13-(b) illustrates that UE's look-ahead capability is defined based on the time point of power allocation described in above (2) in relation to look-ahead capability. Referring to FIG. 13-(b), power allocation for the slot n of the MCG is performed at time point t0, and power allocation for the slot m of the SCG is performed at time point t1. In this case, since t0 is later than t1, the UE may be defined as not having the capability of looking ahead to the slot n in determining the power for UL transmission in the slot m. That is, the UE cannot ensure that there is no UL transmission in the slot n of the MCG. Accordingly, even if the power used for UL transmission in the slot n is smaller than the guaranteed power for the MCG, the UE cannot use the remaining unused power for UL transmission in the slots m+1, m+2, and m+3 of the SCG.

As described above, in a case where dynamic power sharing is configured and the UE reaches the maximum UE power, power adjustment is performed on the NR side but not on the LTE side. This offers two advantages: the first is that power adjustment should be performed on the NR side to minimize the effect on PCell coverage because an LTE cell is generally a PCell. And the second is that it is easier to implement power adjustment in terms of UE's processing because the processing time for LTE (e.g., 4 ms) is generally longer than the processing time for NR.

Figure 14:
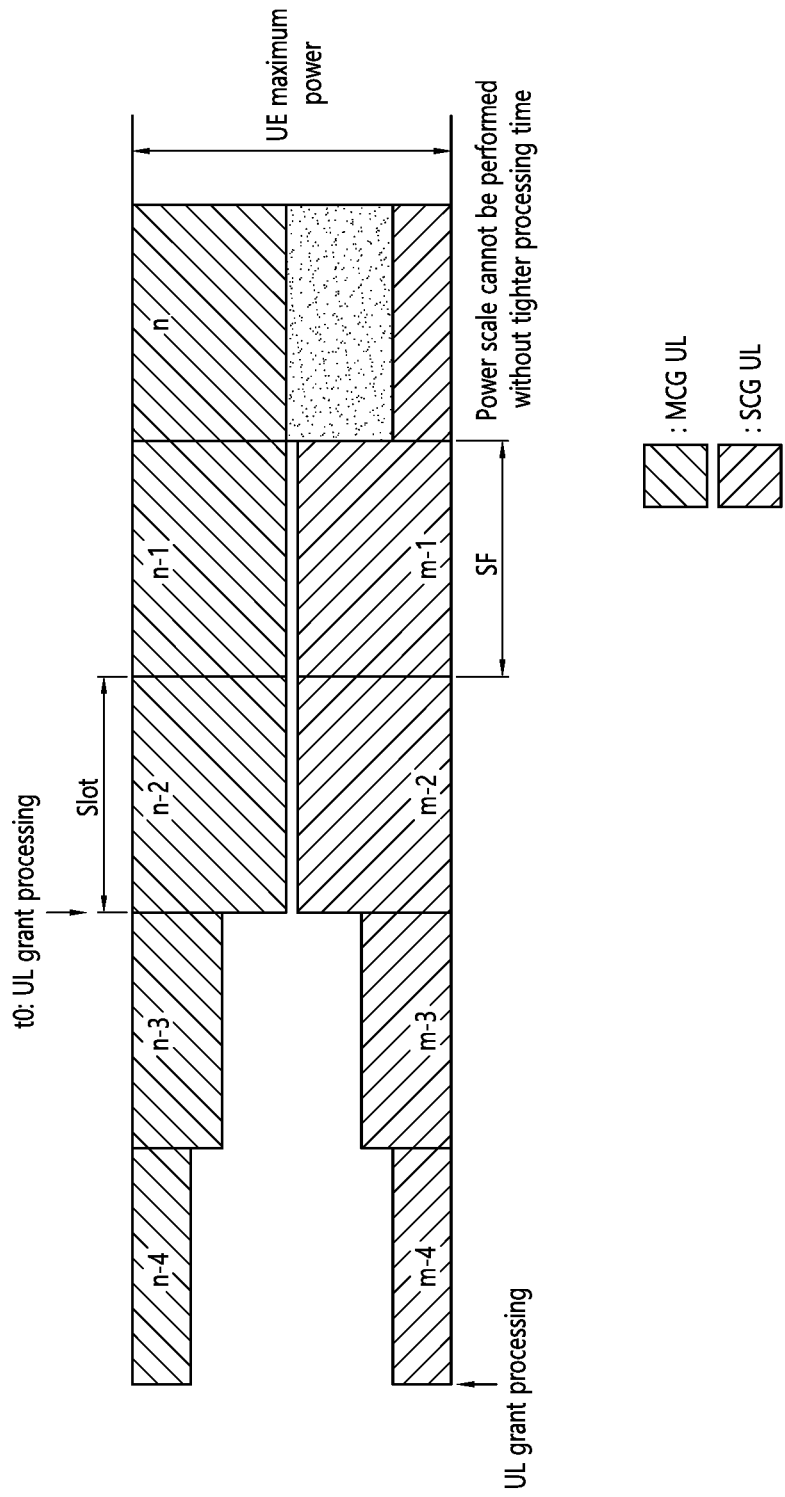
FIG. 14 shows another example of power sharing according to an embodiment of the present disclosure.

FIG. 14 shows another example of power sharing according to an embodiment of the present disclosure. FIG. 14 illustrates that, in the DC between LTE and NR, the power for CG of LTE needs to be reduced depending on processing time in the case of dynamic power sharing, despite that NR is PCell. It is still very important to minimize the effect on PCell coverage even when NR is PCell. Therefore, in this case, power adjustment may be performed on the LTE side but not on the NR side. However, tighter processing time is required on the LTE side, for power adjustment on the LTE side.

Referring to FIG. 14, if NR corresponds to MCG and LTE corresponds to SCG, a UL grant for the slot n of the MCG is transmitted at time point to, and a UL grant for the subframe m of the SCG is transmitted at time point t1. In this case, since t1 is earlier than t0, the UE may be defined as not having the capability of looking ahead to the slot n in determining the power for UL transmission in the subframe m. Accordingly, if power adjustment is required in the subframe m of the SCG, power adjustment cannot be performed without tighter processing time.

For a method for performing dynamic power sharing on the LTE side in the DC between NR and LTE, without affecting the UE's processing time, the following may be taken into consideration.

(1) Like the DC between LTE and NR, power adjustment may be performed only on the NR side (i.e., PCell) without affecting the LTE side. However, this method has the disadvantage that PCell coverage is not guaranteed.

(2) Power adjustment may be performed on the LTE side under the assumption that any PUSCH/PUCCH is not scheduled with processing time shorter than the processing time for LTE. That is, the network may ensure that a PUSCH/PUCCH shall be scheduled on the NR side earlier than the processing time for LTE (e.g., before 4 ms), and the UE may perform adjustment on the LTE side without tight processing time.

(3) Power adjustment may be performed for a later-scheduled UL transmission regardless of LTE/NR. That is, an earlier-scheduled UL transmission has priority in power allocation. For example, the power for UL transmission in LTE is protected because UL transmission in LTE is scheduled earlier than UL transmission in NR. Thus, there is no need for the UE to support tight processing time for dynamic power sharing.

Hereinafter, a method for performing power sharing when power is limited according to the present disclosure will be described. The power determined by each CG may exceed the power permitted for each CG. In this case, power adjustment or omission of channel/OFDM symbol transmission may be need.

Figure 15:
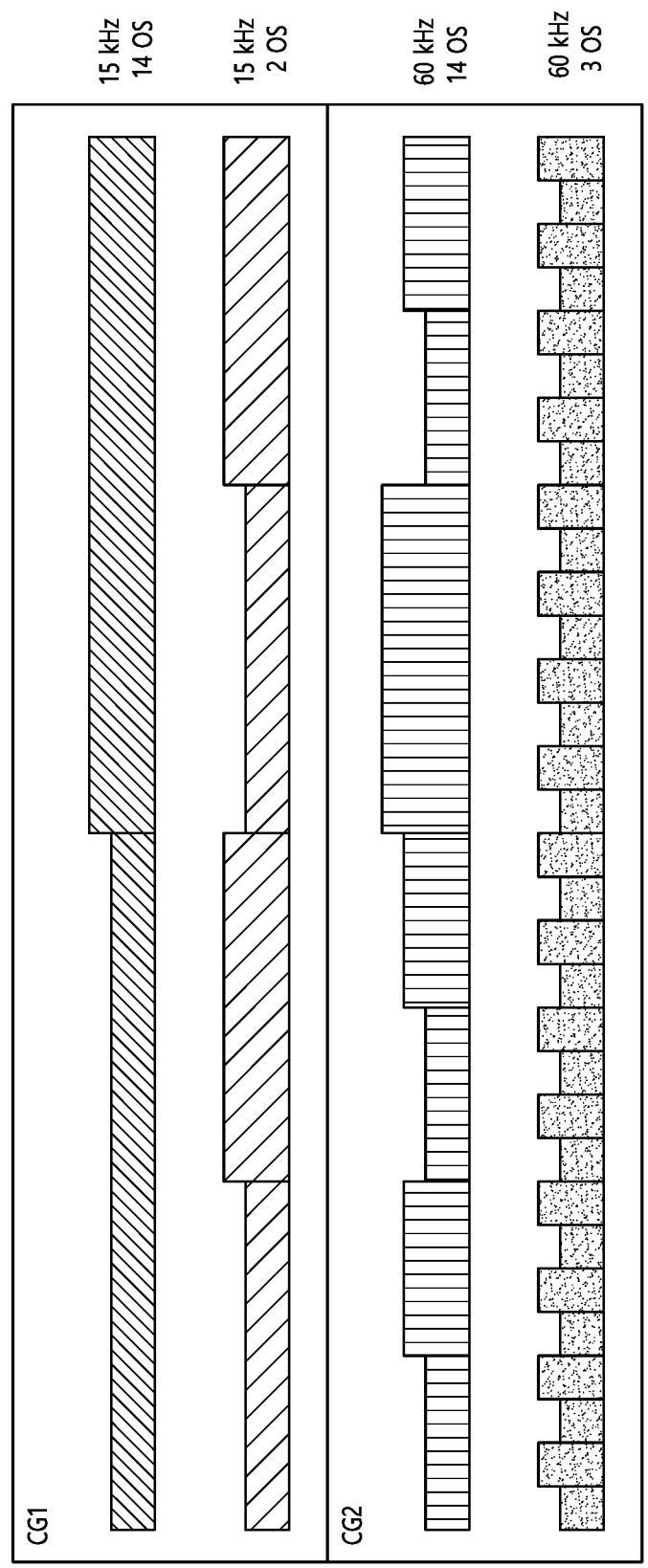
FIG. 15 shows the multiplexing of different TTIs and different numerologies according to an embodiment of the present disclosure.

FIG. 15 shows the multiplexing of different TTIs and different numerologies according to an embodiment of the present disclosure. To explain the method for performing power sharing when power is limited, FIG. 15 may be taken into consideration.

Hereinafter, for convenience of explanation, PUSCH refers to a UL data channel of a given numerology on a slot (e.g., 14 OFDM symbols). Short PUSCH (sPUSCH) refers to a UL data channel of a given numerology on an sTTI (e.g., 2 or 3 OFDM symbols in FIG. 15). PUCCH refers to a UL control channel of a given numerology on a slot (e.g., 14 OFDM symbols). Short PUCCH (sPUCCH) refers to a UL control channel of a given numerology on an sTTI (e.g., 2 or 3 OFDM symbols in FIG. 15). Different TTIs may be present within one carrier or CG, and/or a plurality of carriers or CGs may use different numerologies. In this case, power limitation may be required depending on a collision of a plurality of channels, and the following may be taken into consideration.

First of all, for a single carrier, the following may be taken into consideration.

(1) PUCCH+PUSCH or sPUCCH+sPUSCH:
Power limitation for (s)PUCCH or (s)PUSCH: The power for (s)PUCCH or (s)PUSCH is adjusted to be the maximum UE power.
Power limitation for PUCCH+PUSCH or sPUCCH+sPUSCH: The power for PUSCH or sPUSCH is adjusted to be 0. The power for PUSCH or sPUSCH may be adjusted to be 0. Alternatively, if power limitation is required for PUCCH+PUSCH, UL control information (UCI) piggyback transmission on (s)PUSCH may be taken into consideration, regardless of whether the simultaneous transmission of PUCCH/PUSCH is configured or not.

Table 1 shows power limitations for collisions of PUSCH and PUCCH/sPUCCH.

TABLE 1

|  | PUSCH (partially overlapping with PUCCH) | PUSCH (fully overlapping with PUCCH) |
|---|---|---|
| sPUCCH (e.g, 1/2 | If configured, PUSCH may be shortened. | If PUCCH and PUSCH have the same waveform and the |

TABLE 1-continued

|  | PUSCH (partially overlapping with PUCCH) | PUSCH (fully overlapping with PUCCH) |
|---|---|---|
| OFDM symbols) | If PUCCH and PUSCH have the same waveform and the simultaneous configuration of PUCCH and PUSCH is configured, PUCCH and PUSCH may be simultaneously transmitted. Alternatively, if they partially overlap, PUCCH is piggybacked on PUSCH. | simultaneous configuration of PUCCH and PUSCH is configured, PUCCH and PUSCH may be simultaneously transmitted. Otherwise, PUCCH is piggybacked on PUSCH. |
| PUCCH (e.g., 4 or more OFDM symbols) | If PUCCH and PUSCH have the same waveform and the simultaneous configuration of PUCCH and PUSCH is configured, PUCCH and PUSCH may be simultaneously transmitted. Alternatively, if they partially overlap, PUCCH is piggybacked on PUSCH or omitted. | If PUCCH and PUSCH have the same waveform and the simultaneous configuration of PUCCH and PUSCH is configured, PUCCH and PUSCH may be simultaneously transmitted. Otherwise, PUCCH is piggybacked on PUSCH. |

(2) sPUCCH+PUSCH or PUCCH+sPUSCH: In this case, a similar mechanism to that for the above-described (1), i.e., collisions of PUCCH/PUSCH and sPUCCH/sPUSCH may work. However, instead of piggybacking UCI on PUSCH for sPUCCH/PUSCH, sPUCCH may be transmitted but PUSCH may be omitted.—Power limitation for (s)PUCCH or (s)PUSCH: The power for (s)PUCCH or (s)PUSCH is adjusted to be the maximum UE power.
Power limitation for sPUCCH+PUSCH: The power for PUSCH is adjusted. In this case, the power for PUSCH may be adjusted to be 0.
Power limitation for PUCCH or sPUSCH: The power for PUCCH or sPUSCH is adjusted. This may be configured by the network, or determined based on quality of service (QoS). Alternatively, if power limitation is required for PUCCH+PUSCH, UCI piggyback transmission on (s)PUSCH may be taken into consideration, regardless of whether the simultaneous transmission of PUCCH/PUSCH is configured or not.

For a plurality of carriers, the following may be taken into consideration.

(1) It is determined that one carrier has a plurality of channels, and power control may be performed between carriers.

(2) It is determined that there are a plurality of channels with the same scheduling interval, power control may be performed between carriers having different scheduling intervals. Unless two carriers have the same scheduling interval, the above-described (1) may be used.

Table 2 shows collisions of different channels between a plurality of carriers. In Table 2, Case 1, Case 2, and Case 3 will be described later.

TABLE 2

|  | PUCCH | PUSCH | PUCCH + PUSCH | sPUCCH | sPUSCH | sPUCCH + sPUSCH | PUCCH + sPUSCH | sPUCCH + PUSCH |
|---|---|---|---|---|---|---|---|---|
| PUCCH | Case 1 | Case 2 | Case 1 + Case 2 | Case 1 | Case 2 | Case 1 + Case 2 | Case 1 + Case 2 | Case 1 + Case 2 |
| PUSCH |  | Case 3 | Case 1 + Case 3 | Case 2 | Case 3 | Case 2 + Case 3 | Case 2 + Case 3 | Case 2 + Case 3 |
| PUCCH + PUSCH |  |  | Case 1 + Case 2 + Case 3 | Case 1 + Case 2 | Case 2 + Case 3 | Case 1 + Case 2 + Case 3 | Case 1 + Case 2 + Case 3 | Case 1 + Case 2 + Case 3 |

TABLE 2-continued

| | PUCCH | PUSCH | PUCCH + PUSCH | sPUCCH | sPUSCH | sPUCCH + sPUSCH | PUCCH + sPUSCH | sPUCCH + PUSCH |
|---|---|---|---|---|---|---|---|---|
| sPUCCH | | | Case 1 | | Case 2 | Case 1 + Case 2 | Case 1 + Case 2 | Case 1 + Case 2 |
| sPUSCH | | | | | Case 3 | Case 2 + Case 3 | Case 2 + Case 3 | Case 2 + Case 3 |
| sPUCCH + sPUSCH | | | | | | Case 1 + Case 2 + Case 3 | Case 1 + Case 2 + Case 3 | Case 1 + Case 2 + Case 3 |
| PUCCH + sPUSCH | | | | | | | Case 1 + Case 2 + Case 3 | Case 1 + Case 2 + Case 3 |
| sPUCCH + PUSCH | | | | | | | | Case 1 + Case 2 + Case 3 |

Case 1: The simultaneous transmission of PUCCH/PUSCH may be configured within a CG. Once the simultaneous transmission of PUCCH/PUSCH is configured within a CG, it applies only between carriers. Also, once the simultaneous transmission of PUCCH/PUSCH is configured within a CG, it can be assumed that the simultaneous transmission of PUCCH/sPUCCH is configured/supported. Alternatively, the simultaneous transmission of PUCCH/sPUCCH may be configured individually. Meanwhile, different numerologies may be used in different UL carriers. Accordingly, the simultaneous transmission of PUCCH/PUCCH may refer to different transmissions. Accordingly, the simultaneous transmission of PUCCH/PUCCH may be generally configured regardless of the actual PUCCH transmission period. This may apply only between carriers, or may apply between carriers. Once the simultaneous transmission of PUCCH/PUCCH is configured, both the two configured PUCCHs are transmitted. If a power limitation occurs, power adjustment may be performed for two channels equally, or for a channel to be transmitted later (i.e., priority on a channel to be transmitted earlier), or for a channel to be transmitted longer.—Case 2: The simultaneous transmission of PUCCH/PUSCH can be configured within a CG. Once the simultaneous transmission of PUCCH/PUSCH is configured within a CG, this may apply only between carriers, or may apply between carriers. Also, once the simultaneous transmission of PUCCH/PUSCH is configured within a CG, it can be assumed that the simultaneous transmissions of sPUCCH/PUSCH, sPUCCH/sPUSCH, and PUCCH/sPUSCH are configured/supported. This may apply only between carriers, or may apply between carriers. Once the simultaneous transmission of PUCCH/PUSCH is configured, PUCCH and PUSCH are simultaneously transmitted. Otherwise, UCI is piggybacked on PUSCH. If a power limitation occurs, the power for PUSCH is adjusted.

Case 3: The simultaneous transmission of PUSCH/PUSCH is always supported in a CA situation. When UE shares an amplifier and the power transient period of one carrier affects other carriers, the same power transient period or the same numerology is used, or the network may handle the power transient period. Similarly, the simultaneous transmission of PUSCH/sPUSCH may be supported between carriers.

Case 1+Case 2: Once the simultaneous transmission of PUCCH/PUCCH or PUCCH/PUSCH is handled based on the configuration of the network, the remainder may be UCI piggybacked on PUSCH or may follow the case of PUCCH+PUSCH or PUCCH+PUCCH+PUSCH. PUCCH+PUSCH may follow the above Case 2. PUCCH+PUCCH may follow the above Case 1.

Case 2+Case 3: Once the simultaneous transmission of PUCCH/PUSCH is handled based on the configuration of the network, the remainder may follow the case of UCI piggyback on PUSCH+PUSCH or PUCCH+PUSCH+PUSCH. PUSCH+PUSCH may follow the above Case 2. In this case, power adjustment may be performed on PUSCH not containing UCI. PUCCH+PUSCH+PUSCH may follow the above Case 1, and the same power adjustment may be performed between PUSCHs. However, PUSCH containing UCI may have priority.

Figure 16:
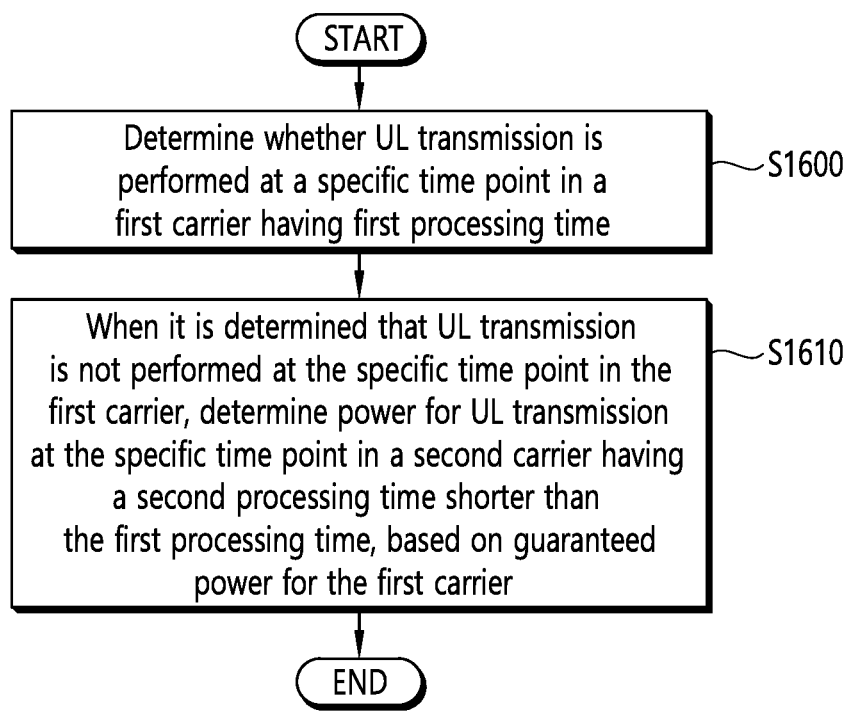
FIG. 16 shows a method for UE to control power according to an embodiment of the present disclosure.

FIG. 16 shows a method for UE to control power according to an embodiment of the present disclosure. The foregoing description of the present disclosure may apply to this embodiment.

In step S1600, UE determines whether uplink (UL) transmission is performed at a specific time point in a first carrier having a first processing time. In step S1610, When it is determined that UL transmission is not performed at the specific time point in the first carrier, the UE determines power for UL transmission at the specific time point in a second carrier having a second processing time shorter than the first processing time, based on guaranteed power for the first carrier. The power for UL transmission at the specific time point within the second carrier may be determined to be greater than the maximum UE power minus the guaranteed power for the first carrier. That is, the guaranteed power for the first carrier may be borrowed in determining the power for UL transmission at the specific time point within the second carrier.

The first processing time may be either a first scheduling period, a first scheduling unit, or a first TTI. The second processing time may be either a second scheduling period, a second scheduling unit, or a second TTI. Alternatively, the first processing time may be one or more symbols or slots that are mapped to a first numerology having a first subcarrier spacing, and the second processing time may be one or more symbols or slots that are mapped to a second numerology having a second subcarrier spacing longer than the first subcarrier spacing. The first carrier may be a carrier of 3GPP LTE or NR, and the second carrier may be a carrier of the NR. The first carrier may be included in a first CG, and the second carrier may be included in a second carrier group.

Whether UL transmission is performed at the specific time point in the first carrier or not may be determined at a first time point, and the power for UL transmission at the specific time point in the second carrier may be determined at a second time point equal to or later than the first time point. In this instance, whether UL transmission is performed at the specific time point in the first carrier or not may be determined depending on whether a UL grant is received at the first time point or not. Also, whether the UL transmission is performed at the specific time point in the first carrier or not may be determined based on different TAs the first and second carriers have.

Meanwhile, when it is determined that UL transmission is performed at the specific time point in the first carrier, the power for UL transmission at the specific time point in the first carrier may be determined with higher priority than the power for UL transmission at the specific time point in the second carrier.

Figure 17:
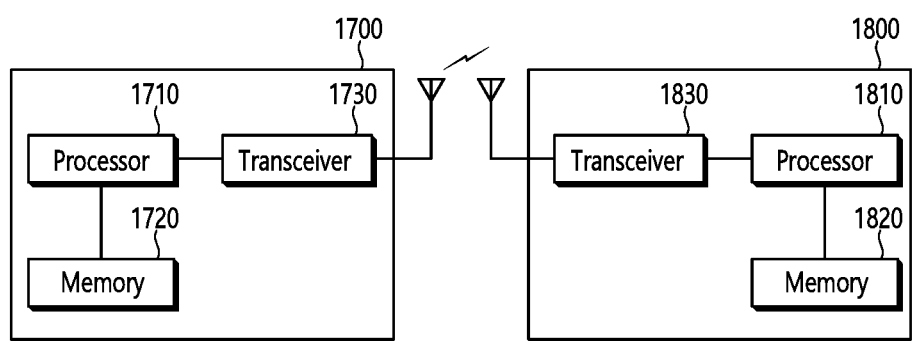
FIG. 17 shows a wireless communication system implemented according to an embodiment of the present disclosure.

FIG. 17 shows a wireless communication system implemented according to an embodiment of the present disclosure.

A UE 1700 includes a processor 1710, a memory 1720, and a transceiver 1730. The memory 1720 is connected to the processor 1710 and stores various information for running the processor 1710. The transceiver 1730 is connected to the processor 1710 and sends a wireless signal to a network node 1800 or receives a wireless signal from the network node 1800. The processor 1710 may be configured to implement the functions, processes, and/or methods explained in this disclosure. More specifically, the processor 1710 may perform the steps S1600 and S1610 in FIG. 16.

The network node 1800 includes a processor 1810, a memory 1820, and a transceiver 1830. The memory 1820 is connected to the processor 1810 and stores various information for running the processor 1810. The transceiver 1830 is connected to the processor 1810 and sends a wireless signal to the UE 1700 or receives a wireless signal from the UE 1700. The processor 1810 may be configured to implement the functions, processes, and/or methods explained in this specification.

The processors 1710 and 1810 may include application-specific integrated circuit (ASIC), other chipset, logic circuit and/or data processing device. The memories 1720 and 1820 may include read-only memory (ROM), random access memory (RAM), flash memory, memory card, storage medium and/or other storage device. The transceivers 1730 and 1830 may include baseband circuitry to process radio frequency signals. When the embodiments are implemented in software, the techniques described herein can be implemented with modules (e.g., procedures, functions, and so on) that perform the functions described herein. The modules may be stored in memories 1720 and 1820 and executed by processors 1710 and 1810. The memories 1720 and 1820 may be implemented within the processors 1710 and 1810 or external to the processors 1710 and 1810 in which case those can be communicatively coupled to the processors 1710 and 1810 via various means as is known in the art.

Figure 18:
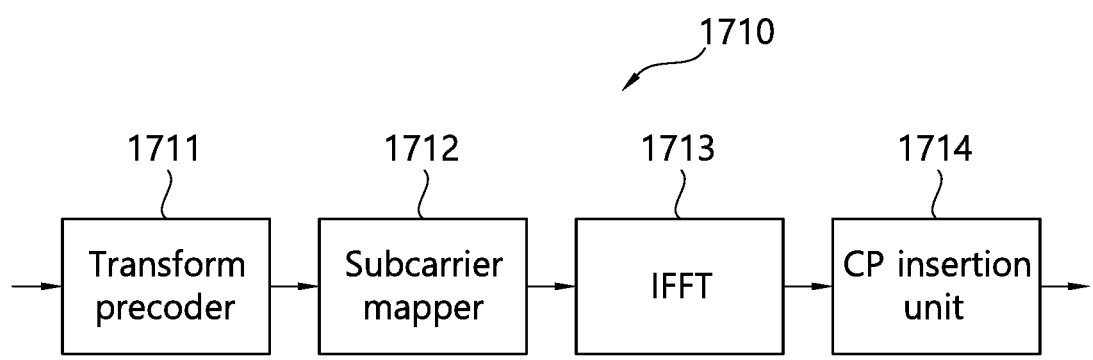
FIG. 18 shows a processor of a UE shown in FIG. 17.

FIG. 18 shows a processor of a UE shown in FIG. 17. The processor 1710 of the UE may include a transform precoder 1711, a subcarrier mapper 1712, an inverse fast Fourier transform (IFFT) unit 1713, and a cyclic prefix (CP) insertion unit (1714).

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a wireless device in a wireless communication system, the method comprising:
   establishing a dual connectivity (DC) with a first carrier group (CG) and a second CG, wherein the first CG is related to a first processing time and the second CG is related to a second processing time;
   determining whether or not an uplink (UL) transmission is performed at a specific time point in the first CG; and
   determining a transmission power at the specific time point in the second CG based on a determination that the UL transmission is not performed at the specific time point in the first CG; and
   performing an UL transmission at the specific time point in the second CG based on the transmission power, wherein:
   in case the second processing time is longer than the first processing time, the transmission power is determined such that the transmission power is less than or equal to a maximum power of the wireless device minus a guaranteed power for the first CG; and
   in case the second processing time is shorter than the first processing time, the transmission power is determined such that the transmission power exceeds the maximum power of the wireless device minus the guaranteed power for the first CG.

2. The method of claim 1,
   wherein the first processing time is either a first scheduling period, a first scheduling unit, or a first transmission time interval (TTI), and
   wherein the second processing time is either a second scheduling period, a second scheduling unit, or a second TTI.

3. The method of claim 1,
   wherein the first processing time is one or more symbols or slots that are mapped to a first numerology related to a first subcarrier spacing, and
   wherein the second processing time is one or more symbols or slots that are mapped to a second numerology related to a second subcarrier spacing longer than the first subcarrier spacing.

4. The method of claim 1,
   wherein the first CG comprises a carrier of 3rd generation partnership project (3GPP) long-term evolution (LTE) or a new radio access technology (NR), and
   wherein the second CG comprises a carrier of the NR.

5. The method of claim 1, wherein whether the UL transmission is performed at the specific time point in the first CG determined at a first time point, and
   wherein the transmission power at the specific time point in the second CG is determined at a second time point equal to or later than the first time point.

6. The method of claim 5, wherein whether the UL transmission is performed at the specific time point in the first carrier is determined based on whether a UL grant is received at the first time point or not.

7. The method of claim 1, wherein whether the UL transmission is performed at the specific time point in the first CG is determined based on different timing advances (TAs) related to the first CG and the second CG.

8. The method of claim 1, wherein, based on a determination that the UL transmission is performed at the specific time point in the first CG, a transmission power at the specific time point in the first CG is determined with a higher priority than the transmission power at the specific time point in the second CG.

9. The method of claim 1, wherein the wireless device is in communication with at least one of a mobile device, a network, and/or autonomous vehicles other than the wireless device.

10. A wireless device in a wireless communication system, the wireless device comprising:
a memory;
a transceiver; and
at least one processor operatively coupled to the memory and the transceiver, wherein the at least one processor is configured to:
establish a dual connectivity (DC) with a first carrier group (CG) and a second CG, wherein the first CG is related to a first processing time and the second CG is related to a second processing time,
determine whether or not an uplink (UL) transmission is performed at a specific time point in the first CG,
determine a transmission power at the specific time point in the second CG based on a determination that the UL transmission is not performed at the specific time point in the first CG, and
control the transceiver to perform an UL transmission at the specific time point in the second CG based on the transmission power, wherein:
in case the second processing time is longer than the first processing time, the transmission power is determined such that the transmission power is less than or equal to a maximum power of the wireless device minus a guaranteed power for the first CG; and
in case the second processing time is shorter than the first processing time, the transmission power is determined such that the transmission power exceeds the maximum power of the wireless device minus the guaranteed power for the first CG.

11. The wireless device of claim 10,
wherein the first processing time is either a first scheduling period, a first scheduling unit, or a first transmission time interval (TTI), and
wherein the second processing time is either a second scheduling period, a second scheduling unit, or a second TTI.

12. The wireless device of claim 10,
wherein the first processing time is one or more symbols or slots that are mapped to a first numerology related to a first subcarrier spacing, and
wherein the second processing time is one or more symbols or slots that are mapped to a second numerology related to a second subcarrier spacing longer than the first subcarrier spacing.

13. The wireless device of claim 10,
wherein the first CG comprises a carrier of 3rd generation partnership project (3GPP) long-term evolution (LTE) or a new radio access technology (NR), and
wherein the second CG comprises a carrier of the NR.

* * * * *